(12) United States Patent
Shadgan et al.

(10) Patent No.: US 12,514,474 B2
(45) Date of Patent: Jan. 6, 2026

(54) METHODS AND APPARATUS FOR NEAR INFRARED SPECTROSCOPY

(71) Applicant: THE UNIVERSITY OF BRITISH COLUMBIA, Vancouver (CA)

(72) Inventors: Babak Shadgan, Port Moody (CA); Brian Kwon, Vancouver (CA); Peyman Servati, Vancouver (CA); Behnam Molavi, Alpharetta, GA (US); Shahbaz Askari, Vancouver (CA); Amir Servati, Vancouver (CA)

(73) Assignee: The University of British Columbia, Vancouver (CA)

( * ) Notice: Subject to any disclaimer, the term of this patent is extended or adjusted under 35 U.S.C. 154(b) by 903 days.

(21) Appl. No.: 17/753,465

(22) PCT Filed: Sep. 4, 2020

(86) PCT No.: PCT/CA2020/051202
§ 371 (c)(1),
(2) Date: Mar. 3, 2022

(87) PCT Pub. No.: WO2021/042215
PCT Pub. Date: Mar. 11, 2021

(65) Prior Publication Data
US 2022/0346673 A1    Nov. 3, 2022

Related U.S. Application Data

(60) Provisional application No. 62/897,182, filed on Sep. 6, 2019.

(51) Int. Cl.
*A61B 5/1459* (2006.01)
*A61B 5/00* (2006.01)
*A61B 5/026* (2006.01)

(52) U.S. Cl.
CPC .......... *A61B 5/1459* (2013.01); *A61B 5/0075* (2013.01); *A61B 5/0261* (2013.01); *A61B 5/686* (2013.01)

(58) Field of Classification Search
CPC ... A61B 5/1459; A61B 5/0075; A61B 5/0261; A61B 5/686
See application file for complete search history.

(56) References Cited

U.S. PATENT DOCUMENTS

| 6,134,460 | A | 10/2000 | Chance |
| 6,748,254 | B2 | 6/2004 | O'Neil et al. |

(Continued)

FOREIGN PATENT DOCUMENTS

| CN | 108344524 B | 8/2021 |
| JP | 4465271 B2 | 5/2010 |

(Continued)

OTHER PUBLICATIONS

Dix, L. M. L. et al., "Monitoring Cerebral Oxygenation in Neonates: An Update", Frontiers in Pediatrics, vol. 5(46), Mar. 2017.

(Continued)

*Primary Examiner* — Dixomara Vargas
(74) *Attorney, Agent, or Firm* — Todd A. Rattray; Oyen Wiggs Green & Mutala LLP

(57) ABSTRACT

A system for performing near infrared spectroscopy (NIRS) monitors tissue oxygenation and/or hemodynamics. The system comprises a sensor coupled to a controller and/or processing device. The sensor comprises a light source which is operable to emit light of various distinct wavelengths and a detector which is operable to collect corresponding backscattered light.

19 Claims, 13 Drawing Sheets

(56) References Cited

U.S. PATENT DOCUMENTS

| | | | |
|---|---|---|---|
| 8,052,605 | B2 | 11/2011 | Muller et al. |
| 8,308,784 | B2* | 11/2012 | Streeter ............... A61N 5/0618 |
| | | | 128/898 |
| 8,315,685 | B2* | 11/2012 | Arizaga Ballesteros ................... |
| | | | A61B 5/02444 |
| | | | 600/344 |
| 9,591,999 | B2 | 3/2017 | Schenkman et al. |
| 10,028,682 | B2 | 7/2018 | Thiele |
| 10,188,872 | B2* | 1/2019 | De Taboada ......... A61N 5/0622 |
| 10,209,178 | B2 | 2/2019 | Carvalho Sousa et al. |
| 10,321,862 | B2* | 6/2019 | Dalene ............... A61B 5/14553 |
| 10,758,743 | B2* | 9/2020 | De Taboada ......... A61N 5/0613 |
| 11,273,319 | B2* | 3/2022 | De Taboada ......... A61N 5/0613 |
| 2007/0078316 | A1* | 4/2007 | Hoarau ................ A61B 5/6826 |
| | | | 600/323 |
| 2007/0093698 | A1 | 4/2007 | Goldberger et al. |
| 2009/0108205 | A1 | 4/2009 | Duffy et al. |
| 2010/0105998 | A1 | 4/2010 | Benni |
| 2011/0060266 | A1* | 3/2011 | Streeter ............... A61N 5/0613 |
| | | | 604/20 |
| 2013/0225955 | A1 | 8/2013 | Schenkman et al. |
| 2014/0276014 | A1* | 9/2014 | Khanicheh ........... A61B 5/0073 |
| | | | 600/425 |
| 2014/0343384 | A1 | 11/2014 | Floyd et al. |
| 2015/0265214 | A1* | 9/2015 | De Kok ............... A61B 5/6843 |
| | | | 29/846 |
| 2015/0282747 | A1 | 10/2015 | Thiele |
| 2016/0235303 | A1 | 8/2016 | Fleming et al. |
| 2016/0278675 | A1 | 9/2016 | Benni |
| 2017/0209083 | A1* | 7/2017 | Zarandi ............... A61B 5/0816 |
| 2017/0215780 | A1 | 8/2017 | Mao et al. |
| 2018/0042513 | A1* | 2/2018 | Connor .................. A61B 5/369 |
| 2018/0214026 | A1* | 8/2018 | Goodall ............... A61B 5/1079 |
| 2018/0214066 | A1* | 8/2018 | Goodall ............... A61B 5/1077 |
| 2019/0150811 | A1 | 5/2019 | Evans et al. |
| 2019/0234869 | A1 | 8/2019 | Sajjadi et al. |
| 2019/0254536 | A1 | 8/2019 | Nahman et al. |
| 2021/0259618 | A1* | 8/2021 | Seidman ............ G01N 33/4833 |
| 2022/0218272 | A1* | 7/2022 | Pollonini ............... A61B 5/015 |
| 2024/0000383 | A1* | 1/2024 | Connor .................. G06F 3/014 |

FOREIGN PATENT DOCUMENTS

| | | |
|---|---|---|
| KR | 102000866 B1 | 7/2019 |
| WO | 2012109661 A2 | 8/2012 |
| WO | 2018168145 A1 | 9/2018 |

OTHER PUBLICATIONS

Boushel, R. et al., "Monitoring tissue oxygen availability with near infrared spectroscopy (NIRS) in health and disease", Scand J Med Sci Sports 2001: 11:213-222.

Suzuki, S. et al., "Tissue oxygenation monitor using NIR spatially resolved spectroscopy", Proc. SPIE 3597, Optical Tomography and Spectroscopy of Tissue III, Jul. 15, 1999.

Arifler, D. et al., "Optimal wavelength combinations for near-infrared spectroscopic monitoring of changes in brain issue hemoglobin and cytochrome c oxidase concentrations", Biomed Opt Express Mar. 1, 2015; 6(3): 933-947.

Hawryluk, G. et al., "Mean Arterial Blood Pressure Correlates with Neurological Recovery after Human Spinal Cord Injury: Analysis of High Frequency Physiologic Data", Journal of Neurotrauma 32:1958-1967, Dec. 15, 2015.

Tator, C. H. et al., "Review of the secondary injury theory of acute spinal cord trauma with emphasis on vascular mechanisms", J Neurosurg 75:15-26, 1991.

Ryken, T. C. et al., "The Acute Cardiopulmonary Management of Patients with Cervical Spinal Cord Injuries", Neurosurgery 72 Suppl 2: 84-92, 2013.

Ploumis, A. et al., "A systematic review of the evidence supporting a role for vasopressor support in acute SCI", Spinal Cord 48:356-362, 2010.

Casha, S. et al., "A systematic review of intensive cardiopulmonary management after spinal cord injury", J Neurotrauma 28: 1479-1495, 2011.

Delphy, D. T. et al., "Quantification in tissue near-infrared spectroscopy", Phil. Trans. R. Soc. Lond. B 1997; 352:649-659.

Lemaire, S. A. et al., "Transcutaneous near-infrared spectroscopy for detection of regional spinal ischemia during intercostal artery ligation: preliminary experimental results", J Thorac Cardiovasc Surg. 2006;132(5):1150-1155.

Badner, N. H,. et al., "Use of spinal near-infrared spectroscopy for monitoring spinal cord perfusion during endovascular thoracic aortic repairs", J Cardiothorac Vasc Anesth. Apr. 2011; 25(2):316-319.

Shadgan, B. et al., "Optical Assessment of Spinal Cord Tissue Oxygenation Using a Miniaturized Near Infrared Spectroscopy Sensor", Journal of Neurotrauma 36:3034-3043, 2019.

Wyser, D. et al., "Wearable and modular functional near-infrared spectroscopy instrument with multidistance measurements at four wavelengths", Neurophotonics 4(4), 041413 (2017).

Matcher, S. J. et al., "Performance Comparison of Several Published Tissue Near-Infrared Spectroscopy Algorithms" Anal. Biochem., 227, 54-68 (1995).

Edmonds, H. L. et al., "Commentary: Advances in noninvasive perispinal oximetry", J Endovasc Ther. Feb. 2011;18(1):96-7.

Kogler, A. S. et al., "Fiber-optic Monitoring of Spinal Cord Hemodynamics in Experimental Aortic Occlusion", Anesthesiology. Dec. 2015;123(6):1362-1373.

Tsiakaka, O. et al., "Toward the monitoring of the spinal cord: A feasibility study", Microelectronics Journal, 2019;88:145-153.

Mesquita, R. C. et al., "Optical monitoring and detection of spinal cord ischemia", PLoS One Dec. 16, 2013;8(12).

Busch, D. R. et al., "Laser safety in fiber-optic monitoring of spinal cord hemodynamics: a preclinical evaluation", J Biomed Opt. 2018; 23:065003.

Amiri, A. R. et al., "Intraoperative assessment of human spinal cord perfusion using near infrared spectroscopy with Indocyanine green tracer technique", Spine J. Dec. 2013; 13(12):1818-1825.

Moerman, A. et al., "Near-infrared spectroscopy for monitoring spinal cord ischemia during hybrid thoracoabdominal aortic aneurysm repair". J Endovasc Ther. Feb. 2011;18(1):91-5.

Demir, A. et al., "Near-infrared spectroscopy monitoring of the spinal cord during type B aortic dissection surgery"., J Card Surg. May 2013;28(3):291-4.

Redlin, M. et al., "Detection of lower torso ischemia by near-infrared spectroscopy during cardiopulmonary bypass in a 6.8-kg infant with complex aortic anatomy", Ann Thorac Surg. Jul. 2006;82(1):323-5.

Tachtsidis, I. et al., "Relationship between brain tissue haemodynamics, oxygenation and metabolism in the healthy human adult brain during hyperoxia and hypercapnia", Adv. Exp. Med. Biol. 645, 315-320., 2009.

Macnab, A. J. et al., "Near infrared spectroscopy for intraoperative monitoring of the spinal cord", Spine (Phila Pa 1976), Jan. 1, 2002; 27(1):17-20.

Luehr, M. et al., "Real-time Monitoring of the Paraspinous Collateral Network Oxygenation by Near Infrared Spectroscopy During and After Open and Endovascular Descending and Thoracoabdominal Aortic Repair", AATS Aortic Symposium 2016: http://aats.org/aortic/abstracts/2014/220.cgi SCNIRS Invention Disclosure 11—Appendix A & B—V6-2019.

Etz D. C. et al., Spinal cord ischemia in open and endovascular thoracoabdominal aortic aneurysm repair: new concepts , J Cardiovasc Surg (Torino), Apr. 2014.; 55(2 Suppl 1):159-68.

* cited by examiner

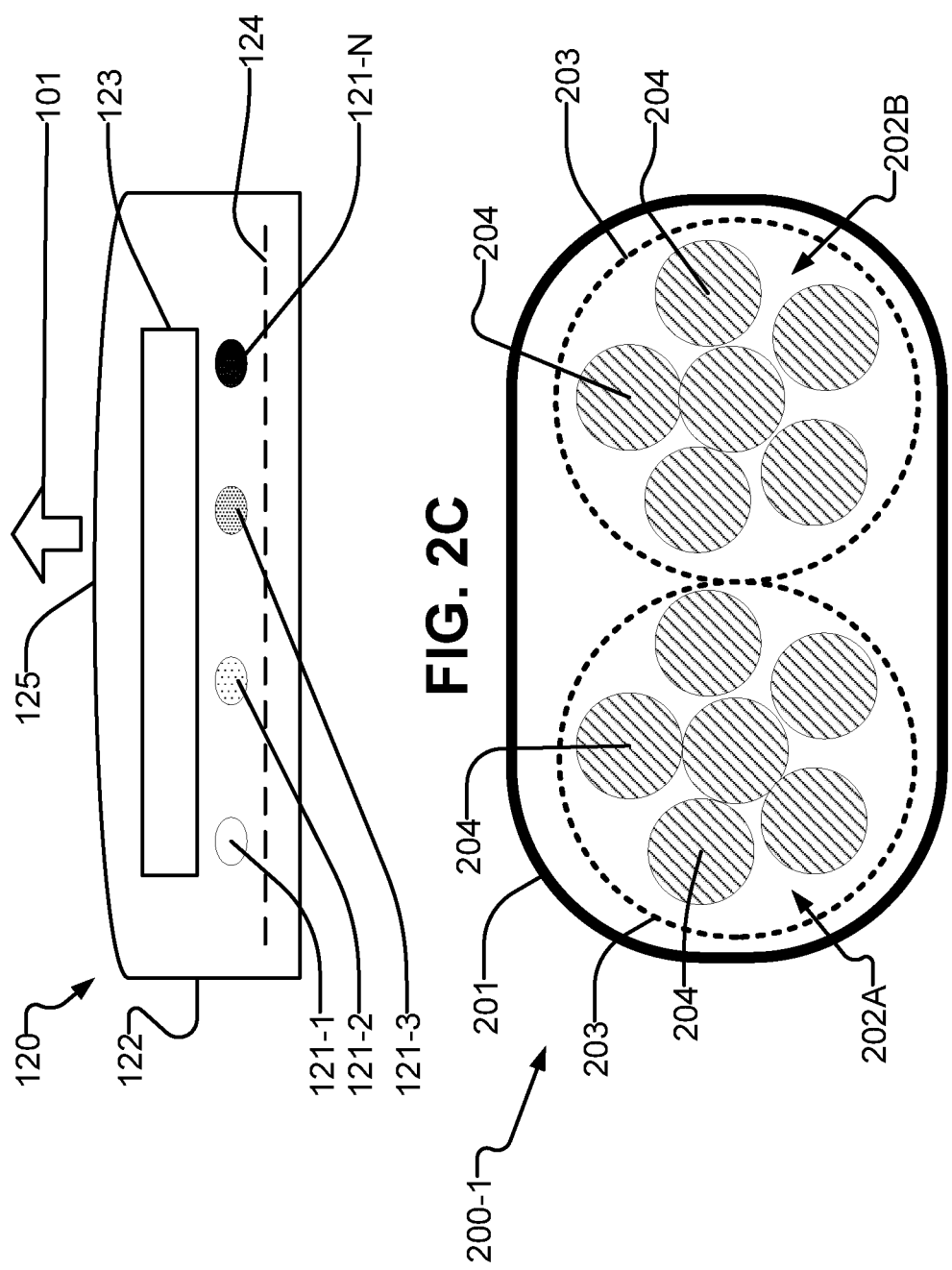

METHODS AND APPARATUS FOR NEAR INFRARED SPECTROSCOPY

CROSS-REFERENCE TO RELATED APPLICATIONS

This application claims priority from U.S. application No. 62/897,182 filed 6 Sep. 2019 and entitled METHODS AND APPARATUS FOR NEAR INFRARED SPECTROSCOPY which is hereby incorporated herein by reference for all purposes. For purposes of the United States of America, this application claims the benefit under 35 U.S.C. § 119 of U.S. application No. 62/897,182 filed 6 Sep. 2019 and entitled METHODS AND APPARATUS FOR NEAR INFRARED SPECTROSCOPY.

GOVERNMENT LICENSE RIGHTS

This invention was made with government support under W81XWH-16-1-0602 awarded by ARMY/MRMC. The government has certain rights in the invention.

TECHNICAL FIELD

This invention relates to systems and methods for performing near infrared spectroscopy (NIRS). This invention has example applications in medical monitoring, for example optical monitoring of spinal cord oxygenation and hemodynamics.

BACKGROUND

Near-infrared spectroscopy (NIRS) is an optical technique that uses near-infrared light to characterize materials. Near infrared light has wavelengths in the range of about 600 nm to about 1000 nm. NIRS involves directing light having wavelengths in or around the near infrared range into a material and detecting resulting scattered light.

NIRS has a wide range of medical applications. NIRS provides a non-invasive technique for monitoring oxygenation of tissue. NIRS may be used to measure local changes in the tissue concentration of oxygenated (O$_2$Hb), deoxygenated (HHb) and total (THb) hemoglobin.

One issue with conventional NIRS systems is that multiple light sources and/or multiple detectors may be required to provide accurate NIRS measurements. Some NIRS sensors are too large or complex for some applications.

A related issue is that conventional NIRS systems are not compatible for use with some parts of the body.

Another issue is that some existing NIRS systems are not optically efficient. Some existing NIRS systems direct light onto tissue and/or collect backscattered light via lossy optical paths.

There remains a need for compact systems that provide accurate NIRS measurements. There remains a need for systems that are well adapted to measure oxygenation and hemodynamics of specific areas of the body. There is a particular need for such systems suitable for NIRS monitoring of spinal cord tissue in clinical settings.

SUMMARY

This invention has a number of aspects. These include, without limitation:
 methods and systems for performing near infrared spectroscopy; and
 methods and systems for monitoring spinal cord oxygenation and/or hemodynamics.

One aspect of the invention described herein provides a near infrared spectroscopy (NIRS) sensor. The NIRS sensor may comprise a body having a dorsal face, a ventral face, and proximal and distal ends. The body may support a light source and a photodetector in a spaced apart relationship. The light source may be operative to emit light from the ventral face of the body. The photodetector may be operative to detect light incident on the ventral face of the body and to generate an output signal. The sensor may also comprise a flexible flap extending laterally from the body along opposed first and second sides of the body.

In some embodiments the flap extends between the first and second sides around the distal end of the body. In some embodiments a portion of the flap that extends around the distal end of the body follows an arc.

In some embodiments the flap has a thickness that is less than a thickness of the body. In some embodiments the flap has a thickness in the range of 0.2 mm to 0.4 mm.

In some embodiments the flap is made of a silicone rubber material.

In some embodiments a material of the flap extends continuously across the dorsal face of the body and encapsulates the light source and the photodetector.

In some embodiments the flap comprises a flexible mesh.

In some embodiments the flap is formed with a curvature such that a ventral face of the flap is concave. In some embodiments the ventral face of the flap has a cylindrical geometry.

In some embodiments the flap is wider at the distal end of the body and tapers in width along the body toward the proximal end of the body.

In some embodiments a profile of a perimeter of the flap is teardrop shaped.

In some embodiments a perimeter of the flap has a convex portion adjacent to the distal end of the body that joins onto concave tapering portions on both sides of the body.

In some embodiments the NIRS sensor comprises lines of weakness in the flap that extend along both sides of the body.

In some embodiments the flap is formed with shallow grooves that extend along both sides of the body on a dorsal face of the flap.

In some embodiments a portion of the body between the light source and the photodetector is opaque to the light emitted by the light source and blocks direct transmission of light from the light source to the photodetector.

In some embodiments the light source is operative to emit light having wavelengths in the range of 600 nm to 1000 nm.

In some embodiments the light source comprises a plurality of light emitters.

In some embodiments the plurality of light emitters are provided in a single package.

In some embodiments the package has a diameter of 2 mm or less.

In some embodiments the plurality of light emitters are spaced apart from one another by distances of 2 mm or less.

In some embodiments the plurality of light emitters each emit a different one of a plurality of wavelengths of light.

In some embodiments the plurality of wavelengths of light are distributed around an isosbestic point.

In some embodiments the isobestic point is at a wavelength of 810 nm.

In some embodiments the plurality of wavelengths includes one or more wavelengths above the isobestic point and one or more wavelengths below the isosbestic point.

In some embodiments the plurality of wavelengths includes a wavelength at the isobestic point.

In some embodiments the plurality of wavelengths comprises at least five wavelengths.

In some embodiments the plurality of wavelengths include two or more wavelengths selected from 660±10 nm, 730±10 nm, 810±10 nm, 850±10 nm, and 940±10 nm.

In some embodiments the plurality of wavelengths comprises wavelengths of about: 660±10 nm, 730±10 nm, 810±10 nm, 850±10 nm, and 940±10 nm.

In some embodiments the light source is spaced apart from the photodetector by a distance in the range of 5 mm to 20 mm.

In some embodiments the photodetector is a first photodetector and the NIRS sensor comprises a second photodetector spaced apart from the light source. The second photodetector may be operative to detect light incident on the ventral face of the body.

In some embodiments the first photodetector is spaced apart from the light source by a first distance and the second photodetector is spaced apart from the light source by a second distance different from the first distance.

In some embodiments the second distance is in the range of 1% to 2 times the first distance.

In some embodiments the dorsal surface of the body is formed with a plurality of recesses. In some embodiments the recesses comprise a row of shallow dimples.

In some embodiments the NIRS sensor comprises a cable connected to the proximal end of the body. In some embodiments the cable comprises first electrical conductors connected to drive the light source and second electrical conductors connected to carry an output signal from the photodetector.

In some embodiments the cable comprises a sheath enclosing the first and second conductors. The first conductors may run within a first electrically conductive shield inside the sheath. The second conductors may run within a second electrically conductive shield inside the sheath.

In some embodiments the first electrical conductors comprise a plurality of electrical conductors each connected to carry electrical current to a corresponding one of a plurality of light emitters of the light source.

In some embodiments the NIRS sensor comprises a trans-amplifier within the body and connected to convert a current signal output by the photodetector to a voltage signal.

In some embodiments the light source, the photodetector and the trans-amplifier are all mounted to a printed circuit board embedded in the body.

In some embodiments the circuit board is a flexible circuit board.

In some embodiments the material of the flap encapsulates the trans-amplifier.

In some embodiments the trans-amplifier is between the light source and the photodetector.

In some embodiments the trans-amplifier is a high sensitivity trans-amplifier. In some embodiments the trans-amplifier is a fast trans-amplifier.

In some embodiments the body comprises a molded biocompatible silicone rubber material.

In some embodiments a NIRS sensor as described herein is combined with a NIRS controller. The NIRS controller may comprise electronic circuits connected to control the light source to emit light of different wavelengths at different times.

In some embodiments the NIRS controller is configured to control plural light emitters of the light source to turn on in a time multiplexed pattern such that the light source emits light of one wavelength at a time.

In some embodiments the NIRS controller is configured to control the light source to emit light of each of five distinct wavelengths, $\lambda_1$ to $\lambda_5$, in a sequence and to sample the output signal of the photodetector in coordination with the operation of the light source to obtain a sequence of light intensity readings each of the light intensity readings corresponding to one of the wavelengths.

In some embodiments the NIRS controller is configured to continuously sample the output signal of the photodetector and to identify portions of the sampled output signal which correspond to different wavelengths emitted by the light source.

In some embodiments the NIRS controller is configured to produce a data frame divided into a plurality of time slots corresponding to a number of light emitters of the light source and to control one of the light emitters to emit light in a corresponding one of the time slots. In some embodiments the data frame includes at least one time slot in which all of the light emitters of the light source are turned off.

In some embodiments the NIRS controller is configured to drive each of a plurality of light emitters of the light source with a corresponding programmable driving waveform.

In some embodiments the NIRS controller is configured to drive a plurality of light emitters of the light source with a corresponding driving signal. In some embodiments the corresponding driving signals for different ones of the light emitters vary in one or more of waveform, duty cycle, amplitude, and frequency.

In some embodiments the NIRS controller comprises a data store which stores data representing a waveform for driving each of a plurality of light emitters of the light source.

In some embodiments a NIRS sensor as described herein is combined with a processing unit configured to process the output signal of the photodetector according to an algorithm to compute one or more NIRS parameters selected from the group consisting of:

changes in oxygenated ($O_2Hb$) chromophore concentration;

changes in deoxygenated (HHb) chromophore concentration;

total hemoglobin (THb);

hemoglobin difference (Hbdiff);

Tissue Oxygenation Index (TOI); and changes in the redox status of cytochrome c Oxidase (CCO).

In some embodiments the algorithm comprises the Modified Beer-Lambert Law.

In some embodiments the processing unit comprises a trained artificial neural network.

Another aspect of the invention described herein provides a method for monitoring one or more characteristics of tissue by near infrared spectroscopy (NIRS). The method may comprise controlling a light source to sequentially illuminate the tissue with light of a plurality of different wavelengths and for each of the wavelengths detecting a portion of the light that is backscattered from the tissue at a photodetector. The method may also comprise processing an output signal of the photodetector to yield a measure of one or more NIRS parameters.

In some embodiments the plurality of wavelengths of light are distributed around an isosbestic point.

In some embodiments the isobestic point is at a wavelength of 810 nm.

In some embodiments the plurality of wavelengths includes one or more wavelengths above the isobestic point and one or more wavelengths below the isosbestic point.

In some embodiments the plurality of wavelengths includes a wavelength at the isobestic point.

In some embodiments the plurality of wavelengths comprises three or four wavelengths.

In some embodiments the plurality of wavelengths comprises at least five wavelengths.

In some embodiments the plurality of wavelengths comprises wavelengths of about: 660±10 nm, 730±10 nm, 810±10 nm, 850±10 nm, and 940±10 nm.

In some embodiments the plurality of wavelengths includes two or more wavelengths selected from 660±10 nm, 730±10 nm, 810±10 nm, 850±10 nm, and 940±10 nm.

In some embodiments the light source comprises a plurality of solid state light emitters and the method comprises controlling the light emitters of the light source to emit light in a repeating sequence and sampling the output signal of the photodetector in coordination with the operation of the light emitters to obtain a sequence of light intensity readings. Each of the light intensity readings may correspond to one of the plurality of wavelengths.

In some embodiments the repeating sequence comprises a plurality of time slots and at least one of the time slots in the repeating sequence is an empty time slot for which all of the plurality of light emitters are controlled to be off.

In some embodiments the method comprises measuring a baseline intensity of light detected in the empty timeslot.

In some embodiments each of the light emitters corresponds to one of the time slots and the method comprises turning on each of the light emitters in the corresponding time slot.

In some embodiments the method comprises applying separately controlled signal gain and/or filtering to the output signal for different ones of the time slots.

In some embodiments the method comprises continuously sampling the output signal at a sampling rate and processing the sampled output signal to identify light intensity peaks corresponding to detected light of each of the plurality of wavelengths.

In some embodiments the method comprises sampling the output signal at a frequency of at least 100 Hz and down-sampling the sampled signal.

In some embodiments the sampling of the output signal is asynchronous to the illumination of the tissue by light of the plurality of different wavelengths.

In some embodiments the method comprises testing each of the light intensity peaks to one or more of:
compare an intensity of the light intensity peak to a minimum peak value,
determine a distance a previous one of the light intensity peaks;
determine a distance to a next one of the light intensity peaks.

In some embodiments the method comprises providing an individual driving signal to the light source for each of the plurality of wavelengths.

In some embodiments the individual driving signals each comprises a corresponding programmable driving waveform.

In some embodiments the corresponding programmable waveforms differ in one or more of:
waveform,
duty cycle, amplitude, and
frequency.

In some embodiments providing the individual driving signals comprises retrieving from a data store digitized waveform data representing a waveform for driving each of light emitters.

In some embodiments the method comprises providing the digitized waveform data to a digital to analog converter, modulating a current source with an output of the digital to analog converter and connecting the current source to a corresponding light emitter by an electronically controlled network of switches.

In some embodiments the method comprises setting levels of the driving signals for the plurality of different wavelengths to cause corresponding levels of the output signals of the photodetector to all be in a desired range.

In some embodiments processing the output signal comprises computing:

$$OD = -\log\frac{I}{I_0} = \sum_i \varepsilon_i c_i Bl + c$$

where OD is the optical density or attenuation, $I_0$ is the incident light intensity, I is the detected light intensity, $\varepsilon_i$ is a molar extinction coefficient for attenuating species i, $c_i$ is the concentration of attenuating species i, BI is the path length, and c is an error adjustment term.

In some embodiments the method comprises normalizing the output signal of the photodetector for each of the plurality of wavelengths. In some embodiments the normalizing comprises applying a factor $V-V_0$ where V is a voltage of a driving signal for a light emitter of the light source and $V_0$ is a turn on voltage for the light emitter.

In some embodiments the method comprises measuring $V_0$ for each of a plurality of light emitters of the light source.

In some embodiment the method comprises determining the one or more NIRS parameters by an artificial neural network.

In some embodiments the method comprises providing as inputs to the artificial neural network adjusted normalized intensities of light detected for the plurality of wavelengths.

In some embodiments the method comprises calculating the adjusted normalized intensities for each of the plurality of wavelengths according to:

$$I_N^{\lambda_i} = \frac{I^{\lambda_i} - I_{BL}}{I_0^{\lambda_i}}$$

where $I^{\lambda_i}$ is a detected intensity, $I_{BL}$ is a baseline intensity and $I_0^{\lambda_i}$ is a driving intensity for a light emitter corresponding to the wavelength.

In some embodiments the method comprises processing the output signals to determine a contact quality measure and providing an indication of the contact quality measure.

In some embodiments the one or more NIRS parameters are NIRS parameters selected from the group consisting of:
changes in oxygenated ($O_2Hb$) chromophore concentration;
changes in deoxygenated (HHb) chromophore concentration;
total hemoglobin (THb);
hemoglobin difference (Hbdiff);
Tissue Oxygenation Index (TOI); and
changes in the redox status of cytochrome c Oxidase (CCO).

In some embodiments the method comprises obtaining the one or more NIRS parameters for a plurality of pairs of light source and photodetector to provide a dataset which specifies the one or more NIRS parameters as a function of depth.

In some embodiments each of the plurality of pairs of light source and photodetector comprises a light source of a plurality of light sources and a corresponding photodetector of a plurality of photodetectors.

In some embodiments the tissue is a person's spinal cord.

In some embodiments the light source emits light from a ventral surface of a sensor and the photodetector receives light through the ventral surface of the sensor.

In some embodiments the method comprises placing the ventral surface of the sensor on a dura of a person's spinal cord.

Further aspects of the invention and features of example embodiments are illustrated in the accompanying drawings and/or described in the following description.

It is emphasized that the invention relates to all combinations of the above features, even if these are recited in different claims.

BRIEF DESCRIPTION OF THE DRAWINGS

The accompanying drawings illustrate non-limiting example embodiments of the invention.

FIG. 2C is a schematic illustration showing an example light source which includes plural light emitters.

FIG. 2D is a cross section view of an example cable which may be used to connect a NIRS sensor as described herein to a NIRS controller comprising electronics for driving the NIRS sensor and/or processing signals from the NIRS sensor.

DESCRIPTION

Throughout the following description specific details are set forth in order to provide a more thorough understanding to persons skilled in the art. However, well known elements may not have been shown or described in detail to avoid unnecessarily obscuring the disclosure. The following description of examples of the technology is not intended to be exhaustive or to limit the system to the precise forms of any example embodiment. Accordingly, the description and drawings are to be regarded in an illustrative, rather than a restrictive, sense.

Figure 1:
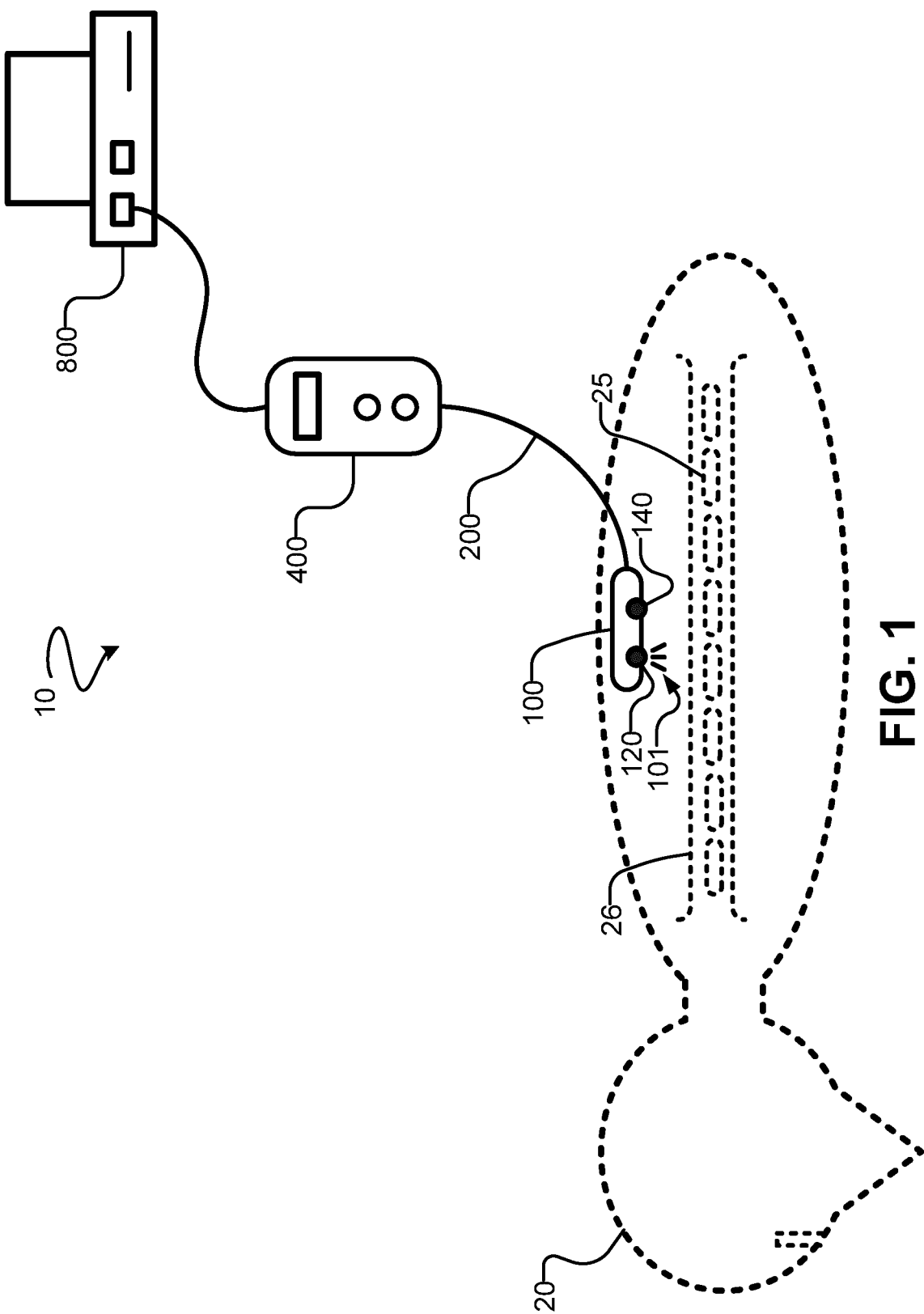
FIG. 1 is a schematic view of a NIRS monitoring system according to an example embodiment of the invention.

FIG. 1 is a schematic view of a NIRS monitoring system 10 according to an example embodiment of the invention. NIRS monitoring system 10 comprises a NIRS sensor 100 which includes a light source 120 and a light or photo detector 140 spaced apart from one another on a flexible support. FIG. 1 shows light 101 being emitted from light source 120. NIRS sensor 100 measures corresponding backscattered light at light detector 140.

NIRS monitoring system 10 may be used for medical applications. NIRS monitoring system 10 can advantageously monitor changes in hemodynamics and tissue oxygenation in real-time. As explained below, system 10 may include adaptations which make system 10 particularly well suited for monitoring tissues of the spinal cord. Use of system 10 may be particularly beneficial in patients suffering from spinal cord injury (SCI) since maintaining adequate oxygenation of spinal cord tissues is very important for promoting recovery from SCI. System 10 may provide real time measurements of tissue oxygenation and/or hemodynamics in the spinal cord of patients suffering from SCI.

Signals are transmitted between NIRS sensor 100 and a control system 400 by a cable 200. Cable 200 may carry signals that control light 101 emitted from light source 120 from control system 400 to NIRS sensor 100. Cable 200 may carry signals that indicate the intensity of backscattered light detected at light detector 140 from NIRS sensor 100 to control system 400.

In the illustrated embodiment, signals are carried between NIRS sensor 100 and control system 400 in the form of electrical signals in conductors in cable 200. NIRS controller 400 may optionally pass signals received from NIRS sensor 100 to a processing device 800 for further processing. NIRS controller 400 may optionally receive instructions from processing device 800.

Cable 200 may comprise a jacket, catheter or tube sheath made of a suitably flexible medical grade material. Electrical conductors may extend along lumens inside the sheath. The material of the sheath is preferably electrically insulating.

In some embodiments, cable 200 comprises a multi-branch shielded twisted pair cable. For example, cable 200 may comprise one or a plurality of inner twisted signal wires enclosed by a first plurality of conductive wires to form an inner shield which electrically isolates the inner twisted signal wires. The shielded inner twisted signal wires may be twisted together with an additional one or a plurality of outer twisted signal wires and covered by a second plurality of outer conductive wires to form an outer shield which electrically isolates the outer twisted signal wires (which includes the shielded inner twisted signal wires). This structure helps to reduce electrical noises and artifacts.

In an example embodiment 32 AWG enameled copper wires are used to carry the signal of detector 140 and to drive light source 120. Two twisted wires which carry the signal from detector 140 are located within an arrangement of 12 wires (38 AWG) which form an "inner shield". Another five wires (32 AWG) for powering light source 120 are twisted together with the shielded photodetector wires. The resulting wire assembly is located within an arrangement of 8 wires (38 AWG) that forms the "outer shield".

NIRS sensor 100 may be sealed to the distal end of cable 200. Outside surfaces of NIRS sensor 100 and cable 200 are sterilisable. This can permit the use of NIRS sensor 100 in invasive applications. Cable 200 may be small in diameter (e.g. less than about 2 mm in diameter) and may be flexible and/or pliable.

In some embodiments cable 200 has a cable structure 200-1 as shown in FIG. 2D. Cable structure 200-1 comprises an outer sheath or jacket 201 that encloses first and second conductor bundles 202A and 202B. Sheath 201 may be made of or coated on the outside with a suitable biocompatible material such as a medical-grade implantable silicone rubber. Sheath 201 may have a suitably small outer diameter (e.g. a diameter of less than 4 mm—for example a diameter in the range of 3 mm to 4 mm).

Conductor bundle 202A may carry higher-power driving signals for driving light source 120. Conductor bundle 202B may carry lower power signals detected at one or more detectors 140.

Each of conductor bundles 202A, 202B comprises an electrically conductive shield layer 203 that encloses plural conductive wires 204. In FIG. 2D, each of conductor bundles 202A, 202B includes six conductive wires 204. Wires 204 may be high-conductivity wires such as copper, silver or silver-coated copper. Wires 204 are each insulated. For example, wires 204 may be covered with an enamel insulating layer. In some embodiments wires 204 comprise polyurethane enamelled wires. In some embodiments wires 204 are reinforced by nylon, silk, steel and/or fibre-glass threads.

Shield layers 203 may be driven by a shield-drive circuit. Shield layers 203 may reduce interference from external sources such as powerline noise or other electromagnetic noise.

Providing separate conductor bundles for driving light source 120 and carrying signals from detector(s) 140 helps to reduce interference and cross talk between light source driving signals and detected signals.

Preferably cable 200 is strong enough to pull on NIRS sensor 100 to remove NIRS sensor 100 from a patient. For example, in some embodiments cable 200 is constructed to withstand a pulling force of at least 6 kgf or at least 8 kgf or at least 10 kgf or at least 15 kgf.

Cable 200 may terminate in a connector that enables cable 200 to be connected to or disconnected from a NIRS controller. Any suitable type of connector may be provided. FIG. 2E shows an example connector 210 that may be provided in a microminiature form-factor.

Connector 210 includes a tubular pin 211 of an electrically insulating medical-grade material (e.g. plastic, molded silicone, epoxy, combinations of these or the like) that has contact rings 212 spaced apart along it. Each of rings 212 may be connected to one conductor or a shield layer of a cable 200 (e.g. as described above). Contact rings 212 may, for example, be made of stainless steel or another durable electrically conductive material.

Pin 211 may be inserted into a tubular socket. An inner face of the tubular socket has contact rings spaced along it. Contact rings 212 and the contact rings of the tubular socket are arranged so that when pin 211 is fully inserted into the tubular socket, each of contact rings 212 is aligned with and in electrical contact with a corresponding one of the contact rings of the tubular socket. The contact rings of the tubular socket may be electrically connected to conductors that connect with a NIRS controller.

Connector 210 may include any suitable number of pairs of corresponding contact rings 212 and contact rings of the tubular socket. For example, connector 210 may include 5 to 15 pairs of contact rings.

In some embodiments, connector 210 has maximum OD (outer diameter) that does not exceed 4 mm. For example the OD may be 3.5 mm or less. The configuration of connector 210 and its potential for being made in very small diameters facilitates the surgical insertion of NIRS sensors 100.

NIRS sensor 100 may be positioned adjacent to a tissue of a patient 20 to monitor alterations of hemodynamics, oxygenation, etc. For example, NIRS sensor 100 may be positioned over a spinal cord 25 of a patient 20 to monitor changes of tissue hemodynamics and oxygenation inside spinal cord 25. Since NIRS does not penetrate deeply in most tissues, for direct monitoring of spinal cord tissue oxygenation it is useful to place NIRS sensor 100 under the skin and other superficial tissue layers. In some embodiments, NIRS sensor 100 is laid upon a membrane 26 (i.e. dura) that encases spinal cord 25 and surrounds the cerebrospinal fluid. This advantageously eliminates the need to insert a probe through dura 26 to thereby reduce risk to injuring spinal cord 25 and/or causing leakage of spinal fluid. NIRS sensor 100 may conform to outer contours of the spinal column or other parts of the anatomy that it is placed against.

NIRS sensor 100 may shine near-infrared light 101 into spinal cord 25 and provide a measure of blood delivery to and/or oxygen consumption of spinal cord 25 based on the amount of near-infrared light 101 reaching light detector 140.

The NIRS Sensor

Figure 2:
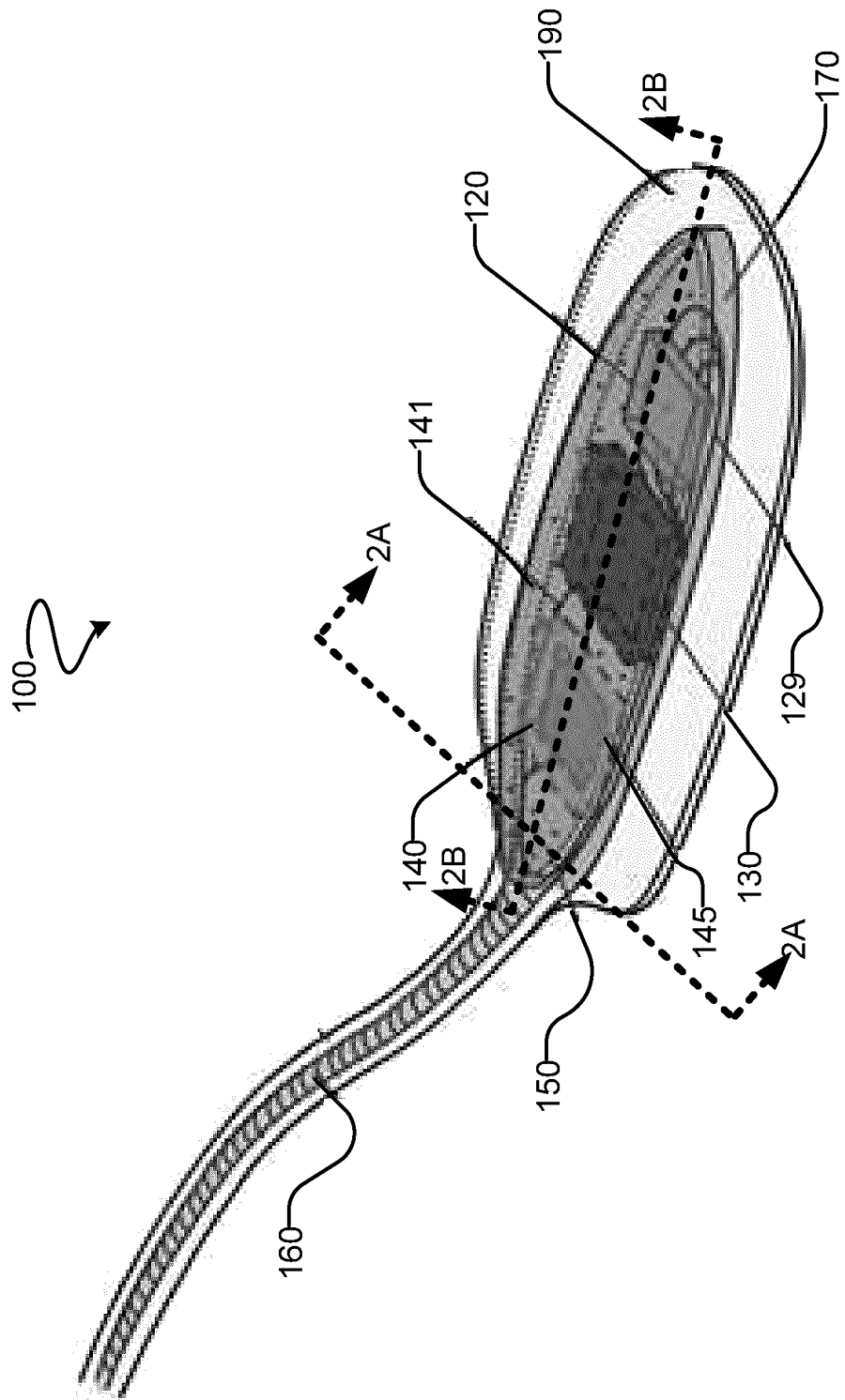
FIG. 2 is a schematic view of a NIRS sensor according to an example embodiment of the invention.
Figure 2A:
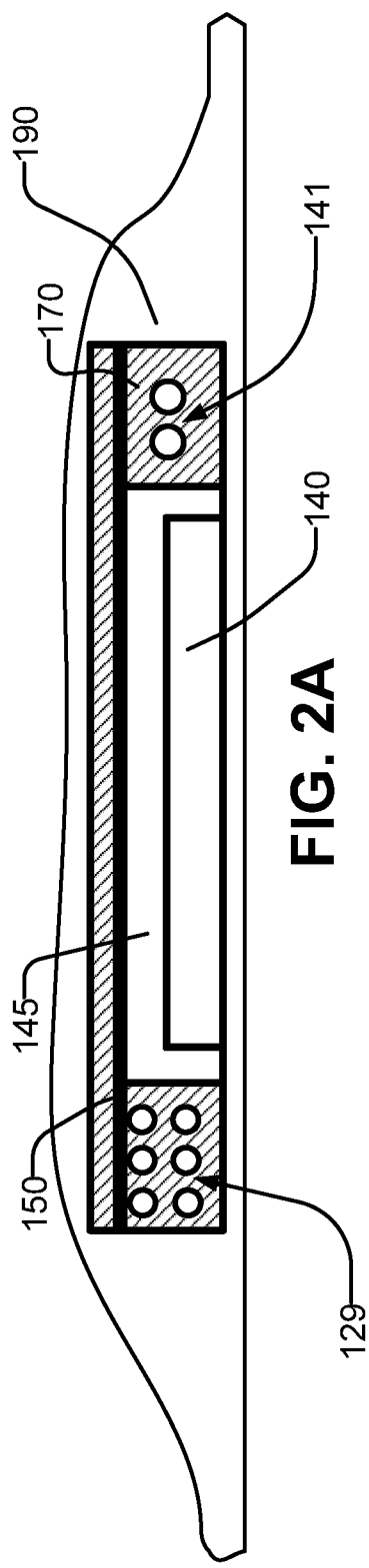
FIG. 2A is a schematic cross section of the FIG. 2 NIRS sensor in the plane indicated by line A-A shown in FIG. 2.
Figure 2B:
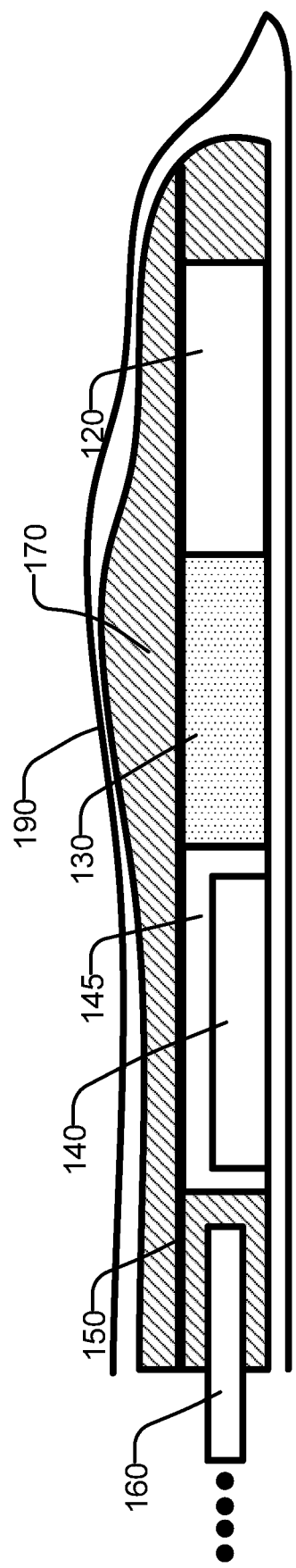
FIG. 2B is a schematic cross section of the FIG. 2 NIRS sensor in the plane indicated by line B-B shown in FIG. 2.
Figure 2E:
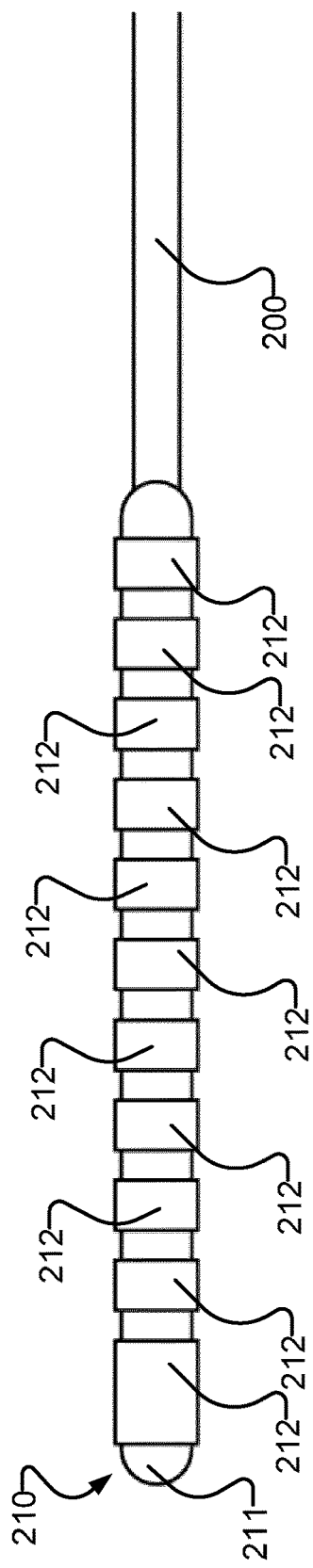
FIG. 2E is a schematic view of an example connector that may be provided to connect a NIRS sensor to a NIRS controller.

FIG. 2 is a schematic view of a NIRS sensor 100 according to an example embodiment of the invention. FIGS. 2A and 2B are schematic cross section views of NIRS sensor 100. NIRS sensor 100 comprises a light source 120 which is operative to emit near-infrared light (e.g. light in the wavelength range of about 600 nm to about 1000 nm) and a light detector 140.

In some embodiments, NIRS sensor 100 has dimensions in the range of 14×4×2 mm or smaller. This advantageously allows NIRS sensor 100 to be positioned precisely at locations adjacent to a tissue of patient 20 (e.g. adjacent to spinal cord 25).

Light source 120 and light detector 140 are spaced apart from one another by a suitable interoptode distance which is typically in the range of 8 mm to 20 mm. In the illustrated embodiment, light source 120 and light detector 140 are spaced apart from one another by a fixed distance within NIRS sensor 100. In such embodiments, the interoptode distance between light source 120 and detector 140 is constant and independent of the placement and/or orientation of NIRS sensor 100.

Light source 120 preferably includes an active light emitter located on NIRS sensor 100. This construction avoids transmission loss (e.g. as could occur if light were transmitted to light source 120 through an optical fiber extending along cable 200, which is another possibility). Light source 120 may comprise a plurality of light emitters 121 in a single package. In some embodiments emitters 121 are spaced apart from one another by distances of 2 mm or less (e.g. 1 mm). For example the package of light source 120 may have a diameter of 2 mm or less.

Each light emitter 121 may emit a different wavelength of light. Light emitters 121 may be selected to emit light at a set of wavelengths in a suitable wavelength band. The wavelengths emitted by the light emitters are typically in the range of about 650 nm to about 1000 nm. The different wavelengths of light may comprise wavelengths distributed around an isosbestic point (e.g. 810 nm). The isosbestic point may, for example, be selected as a wavelength at which the light absorption of a tissue of interest does not vary with changes in relative concentrations of oxygenated and deoxygenated hemoglobin.

For example, the set of wavelengths provided by light emitters 121 may include wavelengths above, below and/or at the isosbestic point. Examples of possible wavelengths of light emitted by light emitters 121 of light source 120 include but are not limited to: 660 nm, 730 nm, 810 nm, 850 nm, and 940 nm. In some embodiments light source 120 comprises five light emitters 121 that respectively emit light at wavelengths of about: 660 nm, 730 nm, 810 nm, 850 nm, and 940 nm. In some embodiments the set of wavelengths includes two or more wavelengths above the isosbestic point, two or more wavelengths below the isosbestic point, and at least one wavelength that is equal to or close to the isosbestic point.

Providing plural light emitters in a single package may advantageously minimize variations in interoptode distance between different ones of the light emitters and detector 140.

Light emitters are configured to emit different wavelengths. Light emitters may be separately controlled. For example, light source 120 may include a separate electrical connection for energizing light source 120 to emit light of each of the plurality of wavelengths. The electrical connections may connect to separate wires 129 of wiring 160.

The light emitters may, for example, comprise light-emitting solid state junctions such as light emitting diodes (LEDs). Each LED may be independently controlled.

In some embodiments, NIRS sensor 100 comprises suitable lenses (not shown) that are arranged to direct light of various wavelengths emitted by light source 120 to impinge on the target tissue at specific angles (e.g.) 90°. Such lenses may be integrated into a package of light source 120 and/or located between a target tissue and light source 120.

FIG. 2C shows schematically an example light source 120 which includes a package 122 that contains light emitters 121-1, 121-2, 121-3 . . . 121-N (individually or collectively emitters 121) which are each configured to emit light of a different wavelength. Light source 120 optionally includes an optical homogenizing element 123 that collects light from any of light emitters 121 and directs the light out of light source 120 as light 101. Light source 120 optionally includes a reflector 124 that redirects light that may be emitted by a light emitter 121 in a rearward direction toward beam 101. Light source 120 optionally includes one or more lenses 125 or other optical elements that increase collimation of beam 101.

In some embodiments, light source 120 comprises five light emitters (e.g. LEDs) with each LED emitting a different wavelength of light.

Detector 140 is located on NIRS sensor 100. Detector 140 is spaced apart from light source 120 by a desired interoptode distance to detect back-scattered light. Detector 140 transmits signals corresponding to the detected light to controller 400 through wires 141. Detector 140 may be sensitive to light in a range of wavelengths (e.g. 430 nm to 1100 nm) which includes a range of wavelengths (of light) that includes the light emitted by light source 120 (e.g. 650 nm to 1000 nm). In some embodiments, detector 140 has a peak sensitivity in the near-infrared regions of the electromagnetic spectrum (e.g. in the region of 750 nm to 1000 nm, for example at 940 nm).

In some embodiments, detector 140 comprises a solid state light detector such as a photodiode. For example, detector 140 may comprise a photodiode biased by an applied voltage such that a magnitude of a photocurrent indicates intensity of light incident on light detector 140. In some embodiments, detector 140 comprises a silicon PIN photodiode (e.g. VBPW34S, Vishay Semiconductors). In some embodiments, detector 140 covers an area of 10 mm$^2$ or less (e.g. 7.5 mm$^2$).

In some embodiments, NIRS sensor 100 comprises suitable lenses or other optical elements (not shown) that are arranged to help detector 140 collect more backscattered light. Such lenses may be integrated into a package of light detector 140 and/or located between a target tissue and detector 140.

It is desirable that, as much as possible, all light detected by light detector 140 is light that has been emitted from light source 120 in a forward direction and then backscattered from tissue to reach light detector 140. NIRS sensor 100 may include features that reduce the detection of ambient light by light detector 140 and/or reduce the transmission of light from light source 120 to light detector 140 by routes other than the backscattering route discussed above.

NIRS sensor 100 may include a light isolation component b 130. Light isolation component b 130 may be located between light source 120 and light detector 140 to prevent or reduce direct transmission of light from light source 120 to light detector 140. Light isolation 130 is made of a material that is substantially opaque to light of the wavelengths emitted by light source 120. For example, light isolation component 130 may be made from a suitable black silicone rubber.

In the illustrated embodiment, light isolation component b 130 is located between light source 120 and detector 140. Light isolation component b 130 is opaque to prevent or otherwise minimize light emitted by light source 120 from directly impinging on detector 140. In some embodiments, isolation component b 130 is made of opaque biocompatible silicone. In some embodiments, light isolation component 130 spans a width equal to the width of light source 120 and/or light detector 140. In some embodiments, light isolation component b 130 spans a width of less than 5 mm.

In some embodiments, NIRS sensor 100 comprises shielding 145 that extends around back and/or peripheral sides of detector 140 to block or attenuate ambient light and/or light emitted by light source 120 from directly reaching the shielded sides of detector 140. Shielding 145 may also advantageously be made of an electrical conductor which electrically shields detector 140 to reduce the effect of electrical interference on an output signal of detector 140. Shielding 145 may be made from a suitable material or materials like flexible thin aluminum, stainless steel, titanium, etc. Shielding 145 may, for example, have the form of a sheet or a pan or box fitted to the structure of detector 140.

In some embodiments, NIRS sensor 100 comprises a light shield 170 covering the back side of light source 120 and/or detector 140. Light shield 170 optionally but preferably forms a wall extending peripherally around light detector 140 and/or light source 120.

In some embodiments, light shield 170 is completely opaque to prevent light from the environment and/or light source 120 from reaching detector 140 except after the light has been scattered back toward light detector 140. In some embodiments, the material of light shield 170 includes additives to enhance the opacity of light shield 170.

In some embodiments, light shield 170 absorbs and dissipates heat generated by the operation of light source 120.

This can reduce operating temperatures of emitters of light source 120 and may reduce heating of the surface of a tissue of interest.

NIRS sensor 100 may comprise a flexible flap 190 that extends laterally away from a region that includes light source 120 and detector 140. Flap 190 may have application for:
- positioning and retaining NIRS sensor 100 at a desired location (e.g. a location for measuring oxygenation or other NIRS parameters of tissue in the spinal cord or other body part); blocking ambient light from reaching light sensor 140;
- blocking light from light source 120 from reaching light detector 140 by paths internal to NIRS sensor 100;
- isolating light source 120, light detector 140 and wiring 160 from blood and other fluids; and/or
- providing a surface for adhering NIRS sensor 100 in place using a suitable biocompatible adhesive.

Flap 190 is preferably integrated into NIRS sensor 100.

Flap 190 may be made to extend as far as desirable outward from the region in which light source 120 and light detector 140 are located. The size and shape of flap 190 may be modified for particular applications. In some embodiments flap 190 is made oversized with the intention that outer parts of flap 190 may be trimmed (e.g. with surgical scissors) to fit NIRS sensor 100 in a particular location. In some embodiments an outer edge of flap 190 may be shaped for a particular application or applications.

Flap 190 may be quite thin, for example, flap 190 may have a thickness in the range of about 0.2 mm to 0.4 mm (e.g. 0.3 mm) in its parts which extend around the periphery of NIRS sensor 100. The region of NIRS sensor 100 that includes light source 120 and detector 140 may optionally be relatively thicker. When flap 190 is made of the silicone materials as described herein it has been found that a thickness of 0.3 mm provides a good balance between being sufficiently robust and providing a good flexibility.

In some embodiments, flap 190 comprises a thin layer of a flexible biocompatible material such as a medical grade implantable silicone material. The material of flap 190 optionally but preferably encapsulates light detector 140 and light source 120 such that the outer surface of NIRS sensor 100 is provided by a continuous surface of the material of flap 190. In such cases the material of those portions of flap 190 in front of light source 120 and light detector 140 is clear or at least translucent at the wavelengths emitted by light source 120. Beam 101 may thus be emitted by light source 120 and pass through the overlying part of flap 190 into adjoining tissue where it is backscattered. Some of the backscattered light passes back through the material of flap 190 overlying light detector 140 where it is detected.

The layer of material in front of light source 120 and light detector 140 may be very thin (e.g. about 300 µm). In some embodiments this is a medical grade silicone material (e.g. Nusil MED-6015).

A light isolation component b 130, shielding 145 and/or light shield 170 may optionally be encapsulated by and/or provided by flap 190. In some embodiments, light isolation component b 130 and/or light shield 170 are provided by material that makes up part of flap 190. For example, these components may be provided by a flexible biocompatible material that is substantially opaque to light having wavelengths to which detector 140 is sensitive.

For example, flap 190 may comprise a first layer of an opaque biocompatible flexible silicone material that extends behind light source 120 and light detector 140 and a second layer of a clear or translucent biocompatible silicone material that extends in front of light source 120 and light detector 140. The first layer may optionally extend around peripheral surfaces of light detector 140 and light source 120. A portion of the first layer may optionally extend into a region between light source 120 and light detector 140 to provide light isolation component b 130. The first layer may optionally encapsulate shielding 145.

NIRS sensor 100 may optionally comprise a flexible mesh 150. Mesh 150 may be located behind light source 120 and detector 140. Mesh 150 advantageously provides improved mechanical support to light source 120 and detector 140. Mesh 150 may be made from a suitable material or materials like flexible polyurethane, medical grade nylon mesh, etc. Mesh 150 may be encapsulated in the material(s) of flap 190.

In some embodiments, shielding 145 is deformable and will hold a shape it is formed into. This may help facilitate forming flap 190 of NIRS sensor 100 to fit against the spinal cord or other parts of the body. For example, shielding 145 may comprise a deformable sheet of aluminum or other bendable material encapsulated in the material(s) of flap 190.

In some embodiments, the material that provides light shield 170 encapsulates back sides of light source 120 and detector 140, wires 129, 141, flexible mesh 150 shielding 145, and parts of wiring 160.

Flap 190 may comprise an adhesive outer layer to facilitate placement and fixation of NIRS sensor 100 over the tissue (e.g. dura 26). In some embodiments, a front face of flap 190 comprises an outer layer of biological adhesive materials (e.g. TISSEEL™ fibrin sealant). The biological adhesive materials may be applied around the edges of flap 190. The biological adhesive materials may help to hold NIRS sensor 100 in place on a target tissue (e.g. dura 26). In some embodiments one or more surfaces of the front face of flap 190 are prepared or conditioned to receive a biocompatible adhesive.

Light source 120 and an edge of flap 190 closest to light source 120 are spaced apart by a suitable distance which is typically in the range of 1 mm to 3 mm.

Constructions of NIRS sensor 100 in which detector 140 and light source 120 are encapsulated, for example, by the material which makes up flap 190, advantageously resist penetration of fluid into NIRS sensor 100 and electrically isolate electrical conductors inside NIRS sensor 100 from a patient.

Wiring 160 may comprise shielded twisted wires electrically connected to controller 400. Wiring 160 includes source wires 129 and detector wires 141. Light source 120 receives power from controller 400 through wires 129. The power causes light source 120 to emit light. Wires 129 may include separate wires for controlling light source 120 to emit light of different wavelengths.

In some embodiments, detector wires 141 are twisted wires enclosed by a first plurality of conductive wires or a first conductive layer to form an inner shield around detector wires 141. In some embodiments, the shielded detector wires 141 are further twisted together with source wires 129 and enclosed by a second plurality of conductive wires or a second conductive layer to form an outer shield around the source wires 129 and the shielded detector wires 141. Such configuration may advantageously keep wiring 160 more compact to minimize the size of cable 200.

Detector wires 141 may comprise wires having suitable dimensions such as 32 AWG. Source wires 129 may comprise wires having suitable dimensions such as 32 AWG. Shielding conductive wires may comprise wires having suitable dimensions such as 38 AWG.

Detector 140 detects light and transmits a corresponding signal to controller 400 by way of detector wires 141.

In some embodiments, wiring 160 is encapsulated in a biocompatible material such as a medical grade implantable silicone or a biocompatible polyurethane. In some embodiments, an end portion of wiring 160 is encapsulated in a material of flap 190. An end portion of cable 200 may also be encapsulated in NIRS sensor 100.

NIRS sensor 100 may be fabricated using suitable techniques like injection molding, thermosetting, etc. For example, the active components of NIRS sensor 100 (e.g. light source 120, detector 140, wiring 160) may be placed within a die and covered with suitable flowable curable elastomeric materials which cure to from light isolation component 130, light shield 170 and/or flap 190.

NIRS Controller

In use, NIRS sensor 100 is connected to an electronic system that controls light source 120 to emit light, monitors the output signal of detector 140 and processes the output signal of detector 140 to determine one or more NIRS parameters. It can be convenient to separate the functions of controlling NIRS sensor 100 and the functions of processing the signals from detector 140 to yield the NIRS parameters.

Figure 3:
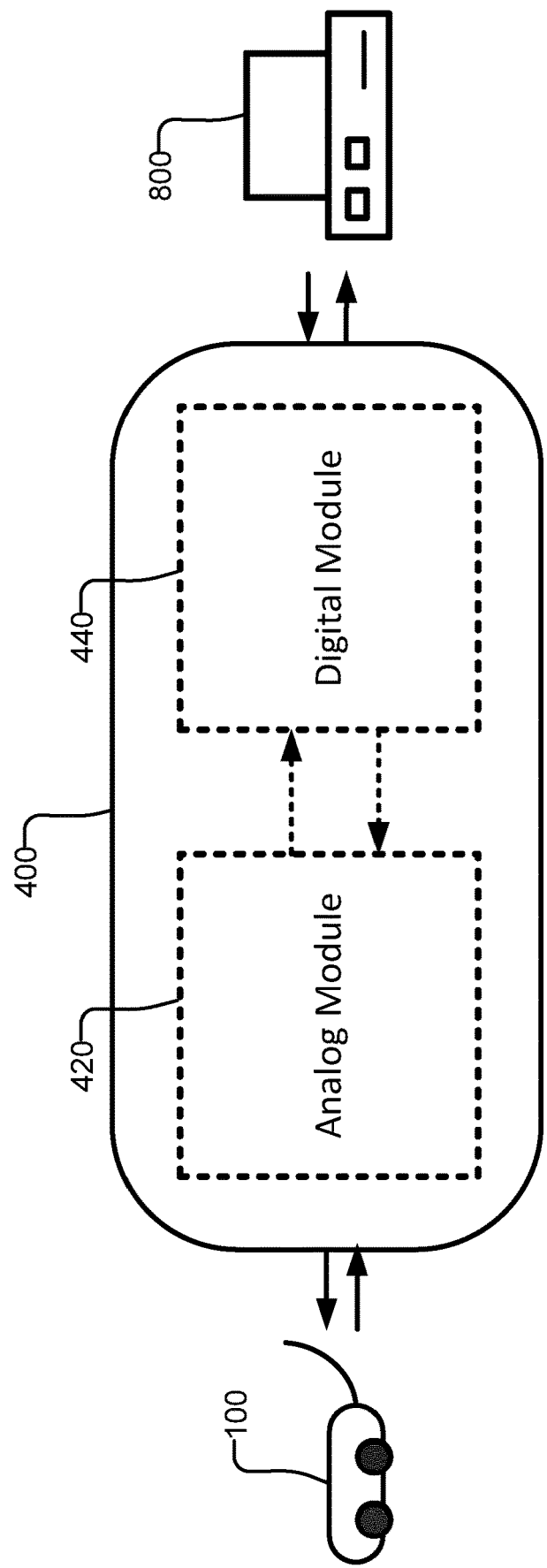
FIG. 3 is a schematic view of a NIRS controller according to an example embodiment of the invention.

FIG. 3 is a schematic view of an example NIRS controller 400. Controller 400 is in signal communication with both NIRS sensor 100 and a processing device 800. In other implementations of the invention functions of controller 400 and processing device 800 may be combined or divided in different ways among plural devices. For example, controller 400 may collect and store data while it is not connected to processing device 800. The stored data may subsequently be uploaded to processing device 800. In some embodiments, controller 400 operates independently from processing device 800.

NIRS controller 400 controls light source 120 to emit light of different wavelengths. In an example mode of operation NIRS controller 400 controls light emitters of light source 120 to turn on in a time multiplexed pattern such that light source 120 emits light of one wavelength at a time. For example, in a case where light source 120 is operable to emit light of five distinct wavelengths, $\lambda_1$ to $\lambda_5$, NIRS controller 400 may control the corresponding light emitters of light source 120 to emit light in sequence $\lambda_1$, $\lambda_2$, $\lambda_3$, $\lambda_4$, $\lambda_5$, $\lambda_1$, . . . , etc. NIRS controller 400 may be configured to sample the output of light detector 140 in coordination with the operation of the light sources to obtain a sequence of light intensity readings each corresponding to one of the wavelengths. In some embodiments, NIRS controller 400 is configured to continuously sample the output of light detector 140 and to identify portions of the signal which correspond to different wavelengths emitted by light source 120.

For example, NIRS controller 400 may be configured to produce a data frame divided into a plurality of time slots corresponding to the number of emitters 121 of light source 120. The time slots may have equal durations but this is not mandatory. Each emitter may be turned during one or more corresponding time slot. In some embodiments, for at least one of the time slots in a frame, all of the emitters of light source 120 are turned off. The empty time slot may act as a marker to help NIRS controller 400 identify the timing of time slots and/or the order of wavelengths emitted by the various emitters of light source 120.

Figure 3A:
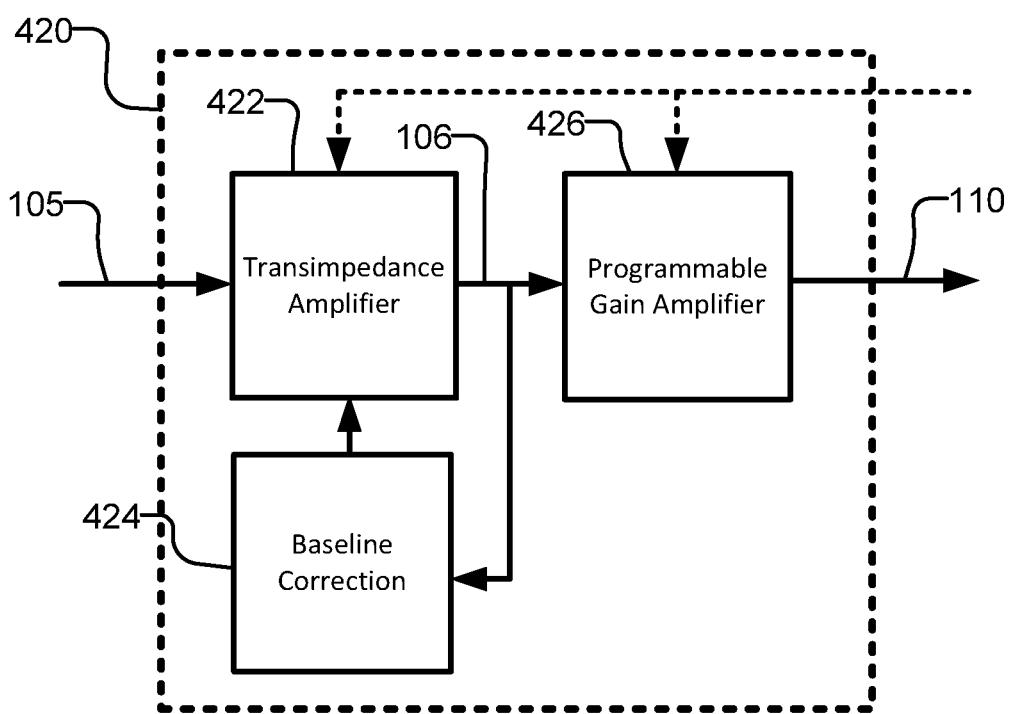
FIG. 3A is a block diagram of an example analog module in the NIRS controller shown in FIG. 3.
Figure 3B:
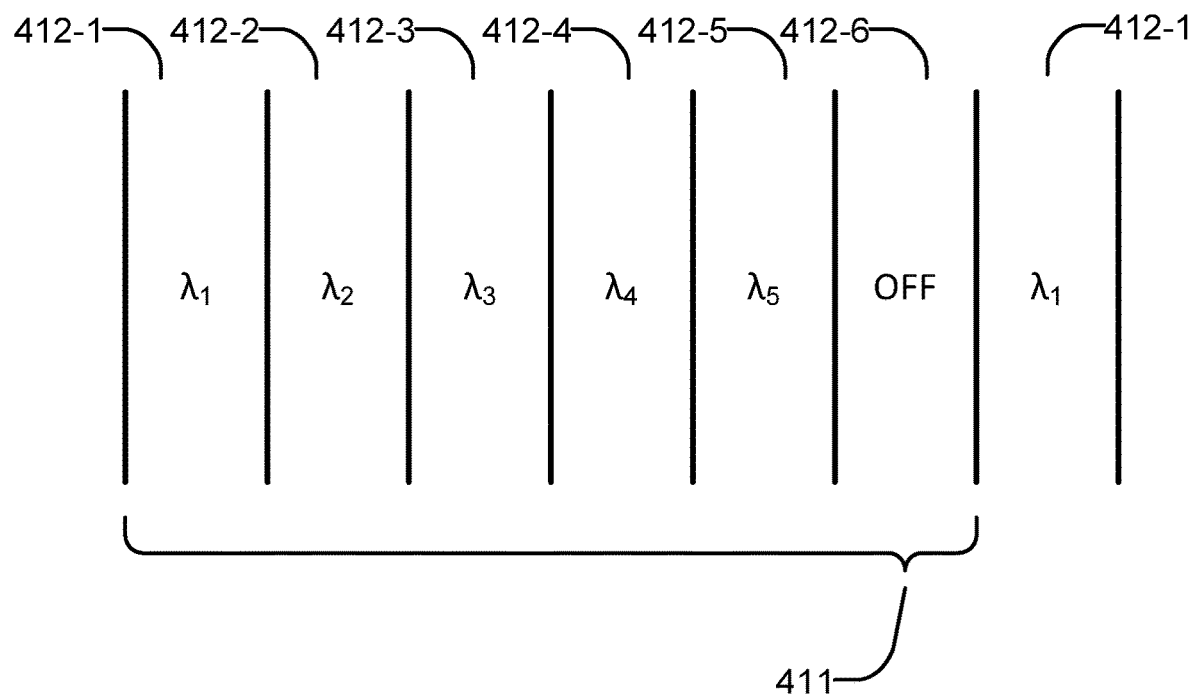
FIG. 3B is a schematic view of a data frame.

FIG. 3B shows an example data frame 411 with time slots 412-1 to 412-5 corresponding to different wavelengths of light emitted by light source 120 and an empty time slot 412-6. Empty timeslot 412-6 may be used to measure a baseline intensity of detected light.

From an architecture perspective, each frame in the FIG. 3B example is divided into 6 equal time slots. Each LED is turned on for the duration of one time slot with the defined waveform. One time slot is left empty as a synchronization marker to help identify the order of the wavelengths.

In some embodiments the output of detector 140 is sampled continuously at a desired sampling rate. Peaks corresponding to detected light of individual wavelengths may be identified by processing the sampled output signal from light detector 140. For example, sampling may be performed at 100 Hz. NIRS controller may provide a data frame representing a full cycle of operation of light source 120 which, in this example might include 480 samples which each representing 10 ms. In some embodiments the sampled signal is downsampled (e.g. to 10 Hz).

Figure 3C:
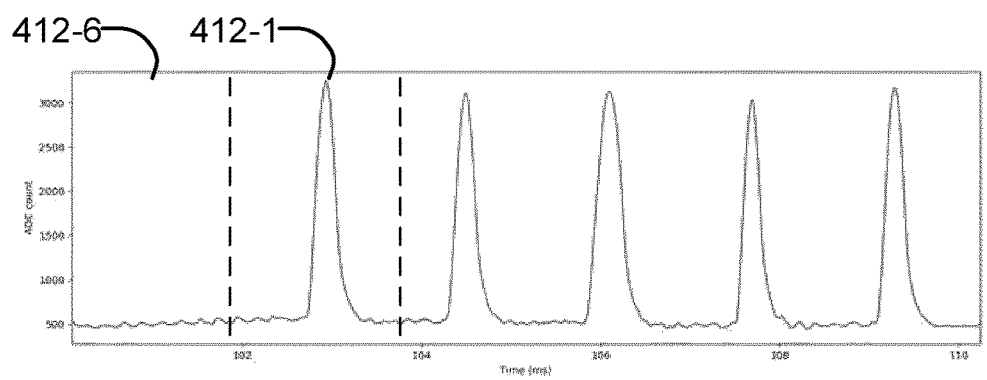
FIG. 3C shows an example frame of sampled data from a light detector.

Each frame may be processed to find the peaks that meet some specific criteria (including minimum peak value, distance from previous and next peak, etc.). The empty time slot (e.g. 412-6) may be used to determine which peak corresponds to which emitter 121. FIG. 3C shows an example frame of sampled data from light detector 140.

This scheme does not require sampling of the output signal of detector 140 to be coordinated with driving of light emitters 121.

The brightness of light emitters in light source 120 may be different for different wavelengths. Also, the sensitivity of light detector 140 may differ for different wavelengths. Also, the proportion of light absorbed in tissues may be wavelength dependent. In order to facilitate measurement of the intensity of backscattered light at reasonable resolution and/or to reduce the effect of ambient light on measurements it can be desirable to separately control the signals applied to light source 120 for generating light at each of the plural wavelengths.

In some embodiments, the emitters (e.g. LEDs) of light source 120 are individually driven in a constant current mode during the corresponding time slots. In some embodiments, the emitters (e.g. LEDs) of light source 120 are each driven with a corresponding programmable driving waveform. The driving waveform for each of the emitters may be selected to control bandwidth, adapt to hardware and sensor parameters, etc.

For example, NIRS controller 400 may be configurable to drive each light emitter of light source 120 with a corresponding selected driving signal. Driving signals for different ones of the light emitters may vary in waveform, duty cycle, amplitude, frequency and/or other characteristics. In some embodiments, NIRS controller 400 is configurable to drive each light emitter of light source 120 with a driving signal having an arbitrary waveform (instead of, for example, a square wave or other hardware dependant waveform).

NIRS controller 400 may comprise a data store which stores data representing a waveform for driving each of light emitters 121. The data may comprise a digitized waveform. NIRS controller 400 may comprise a digital to analog converter having an output that is connected to modulate a current source. An output of the current source may be connected to drive the corresponding light emitter 121 by way of an electronically controlled network of switches. In each time slot, NIRS controller 400 may operate the switches to deliver current from the current source to a corresponding one of light emitters 121 and apply the corresponding waveform data to the DAC so that the corresponding light emitter is driven according to the appropriate stored waveform. In other embodiments separate current sources may be connected to drive each of light emitters 121. In such embodiments a switching network may not be required.

The driving signals may be established in a calibration step in which light source 120 is controlled to emit light into a phantom as discussed elsewhere herein.

In the illustrated embodiment, NIRS controller 400 comprises an analog module 420, a digital module 440, and suitable converters (e.g. ADC and/or DAC) to facilitate signal communication between analog module 420 and digital module 440.

Analog module 420 may power and/or control light source 120. In some embodiments, analog module 420 receives signals detected at detector 140. In some embodiments, analog module 420 performs initial signal conditioning and/or low level processing on the signal received from detector 140. For example, analog module 420 may amplify and/or filter the signal before sampling the signal at an analog to digital converter. In some embodiments different signal conditioning is performed for different time slots. For example, parameters such as signal gain and filtering may be separately adjustable for different time slots.

FIG. 3A is a block diagram of an example analog module 420 receiving a current signal 105 from light detector 140 of NIRS sensor 100. Analog module 420 comprises a transimpedance amplifier (TIA or "trans-amplifier" as may be known in the art) 422 which converts current signal 105 received from NIRS sensor 100 into a voltage 106. In some embodiments, voltage 106 is fed back to TIA 422 through a baseline correction module 424. Current signal 105 is averaged and subsequently subtracted from background current to avoid saturating TIA 422. Baseline correction module 424 can advantageously decrease the sensitivity of analog module 420 to changes in the level of ambient light detected by light detector 140.

In some embodiments, analog module 420 comprises a second amplifier stage 426 to further adjust the gain and offset of preliminary signal conditioning provided by analog module 420. In some embodiments second amplifier stage 426 comprises a programmable gain amplifier (PGA).

In some embodiments, analog module 420 is implemented as a separate plugin board. This advantageously allows analog module 420 to be modified or replaced without changing the rest of the design of NIRS controller 400.

Digital module 440 is in signal communication with NIRS processing device 800. Digital module 440 operates to transmit and/or receive data.

In some embodiments, digital module 440 implements a time division multiplexing scheme for presenting measurements of the intensity of light detected by detector 140 for each of the plurality of wavelengths to NIRS processing device 800. For example, frames each containing digital data representing light intensities detected at detector 140 for a full sequence of wavelengths may be sequentially transmitted to NIRS processing device 800.

Example NIRS Sensor

FIGS. 3D through 3H show an example NIRS sensor 500. Sensor 500 comprises a body 502 that houses a light source 504 (e.g. a light emitting diode) and one or more photodetectors 506 (e.g. photodetectors 506A and 506B at different distances from light source 504). In some embodiments sensor 500 comprises a plurality of light sources 504 and a single photodetector 506. Light sources 504 may be at different distances from photodetector 506.

A soft flexible flap 510 extends outwardly from body 502. Flap 510 may provide one or more of the functions described elsewhere herein.

Flap 510 may be selectively weakened along a line close to body 502 to facilitate bending flap 510 in a dorsal direction. The weakness may be provided, for example, by shallow grooves 510A that extend along a dorsal face of flap 510 close to body 502. Flap 510 may bend in the dorsal direction when sensor 500 is being withdrawn from a patient. Features such as grooves 510A make such bending easier and thereby facilitate removal of sensor 500.

In some cases it may be desirable to withdraw sensor 500 from a site at which sensor 500 has been placed by pulling sensor 500 in a proximal direction (e.g. by pulling on a cable 200). This may avoid disturbing tissues overlying the site. Providing a flap 510 which tends to fold in the dorsal direction when sensor 500 is being pulled to withdraw sensor 500 from a site at which sensor 500 has been placed can help to avoid pushing or damaging the target tissue (e.g. the spinal cord of a patient) during withdrawal of sensor 500.

In the illustrated embodiment flap 510 has a "teardrop" shape in which flap 510 is wider toward the distal end 502A of body 502 and tapers in width toward a proximal end 502B of body 502. The teardrop shape of flap 510 may facilitate removal of sensor 500 by pulling sensor 500 in the proximal direction. In the illustrated embodiment, flap 510 is significantly narrower at the location of light source 504 than at the location(s) of photodetector(s) 506.

Figure 3D:
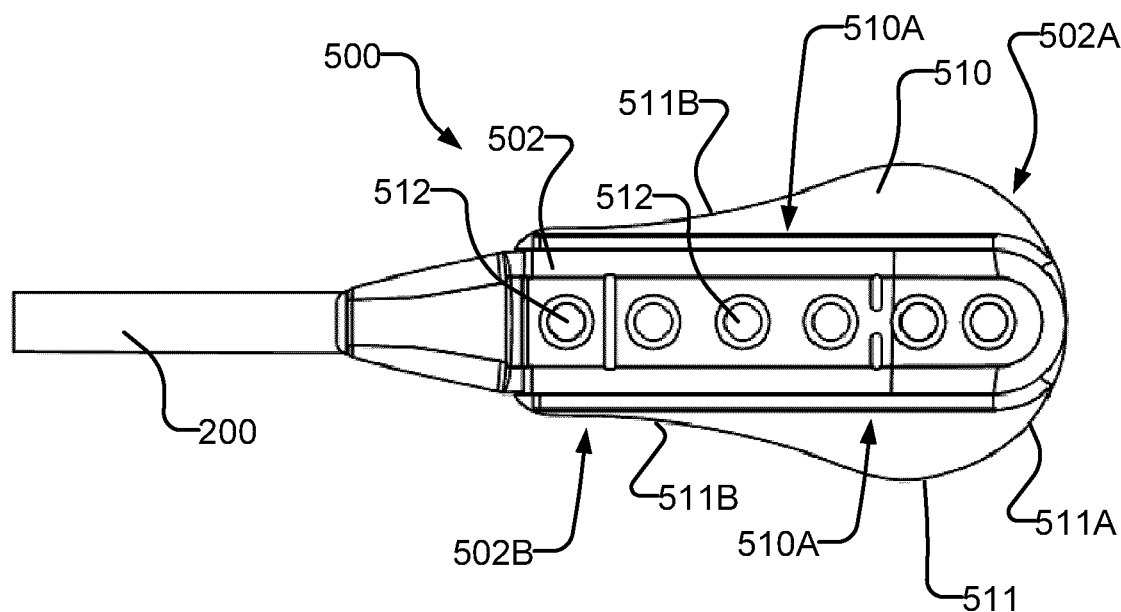
FIGS. 3D, 3E, 3F, 3G and 3H are respectively a top plan view, bottom plan view, side elevation view, transverse cross section and longitudinal cross section of a NIRS sensor according to an example embodiment of the present technology.
Figure 3E:
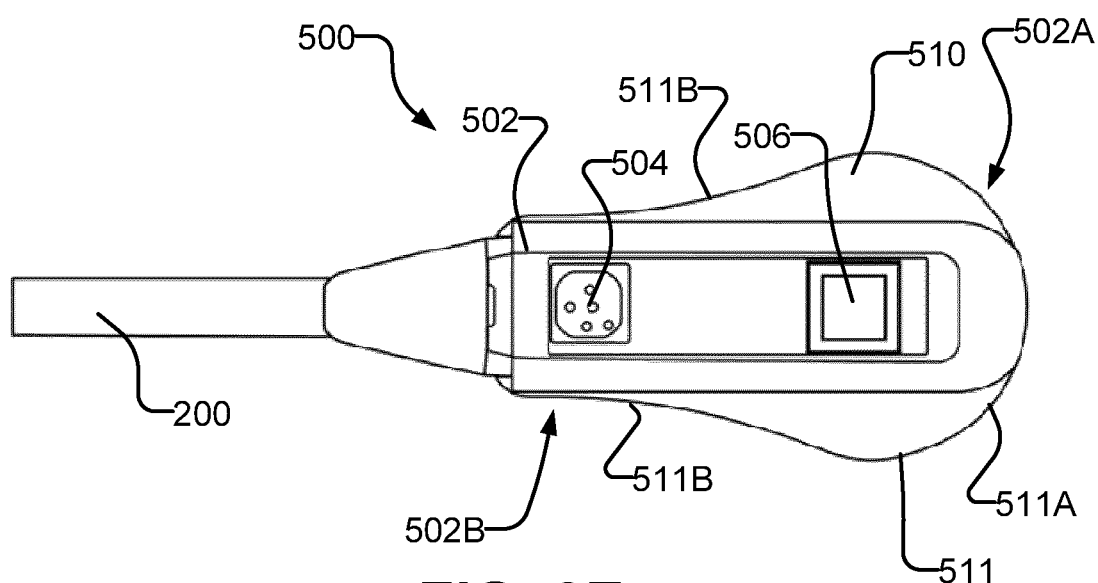
Figure 3F:
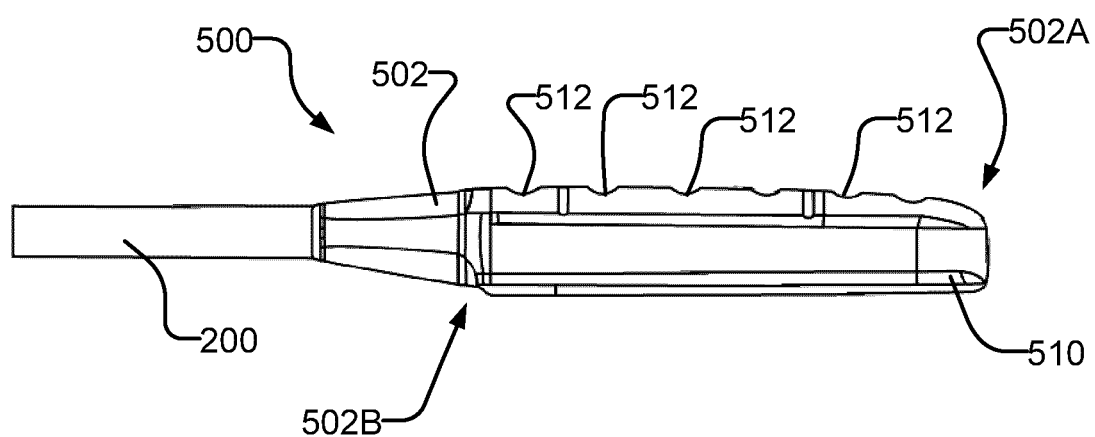
Figure 3G:
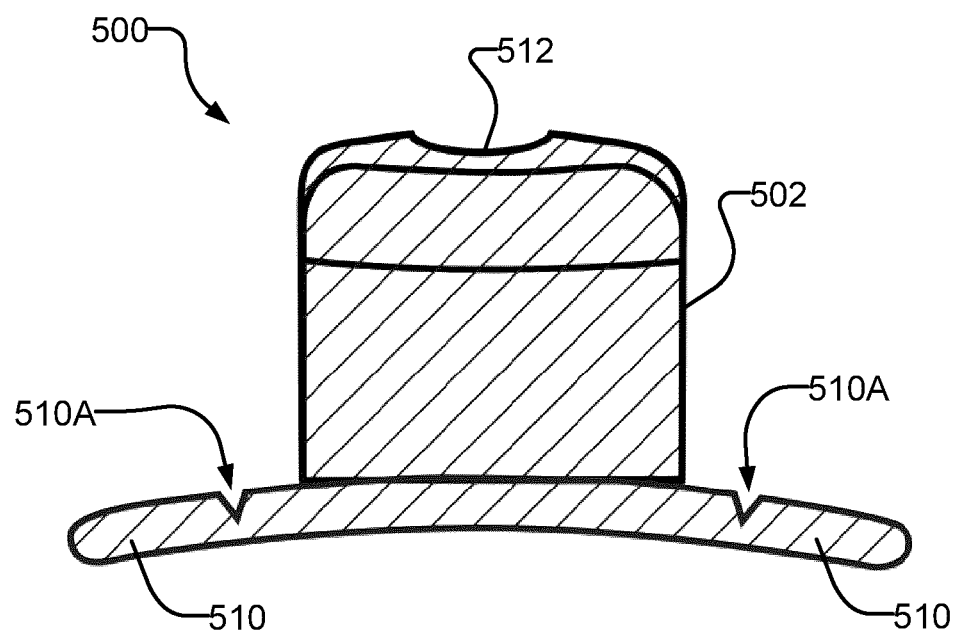
Figure 3H:
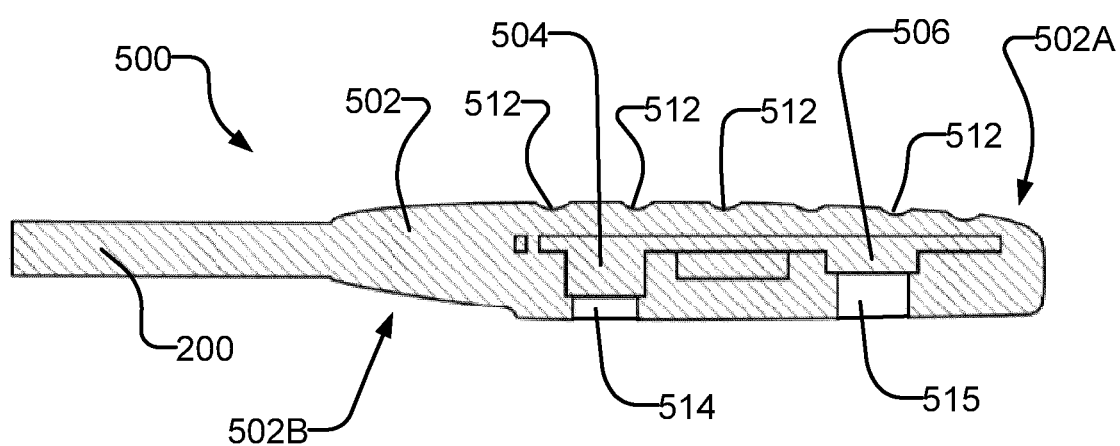

Flap 510 may be rounded in its portion near distal end 502A of body 502. For example, FIG. 3D shows an embodiment in which the perimeter 511 of flap 510 has a convex portion 511A in its portions near distal end 502A of body 502 that joins onto concave tapering portions 511B on either side of body 502. Convex portion 511A may, for example, be semi-circular or nearly so. Concave portions 511B may taper to join the edge of body 502 near proximal end 502B and/or near the longitudinal location of light source 504.

In some embodiments (see e.g. FIG. 3G), flap 510 is formed to curve toward a longitudinally-extending axis so that a dorsal surface of flap 510 is concave. The dorsal surface of flap 510 may, for example, have a cylindrical geometry. This curvature may help to position sensor 500 at a desired location (e.g. over the spinal cord dura of a patient) and to keep sensor 500 in the desired location.

As discussed above, sensor 500 may be configured to avoid direct transmission of light from light source 504 to photodetector(s) 506. In sensor 500 this may be achieved by forming most of body 502 of a material that is opaque to the light detected by photodetector(s) 506 and/or light source 504. For example, body 502 may be formed primarily of a dark tinted medical-grade silicone rubber material such as a liquid silicone elastomer (e.g. MED-4800-7 NuSil, USA) tinted with a medical-grade colour masterbatch.

To allow light to exit from light source 504 and to allow light to be detected by photodetector(s) 506 a portion 514 of the material of body 502 that overlies light source 504 and a portion or portions 515 of the material of body 502 that overlies photodetector(s) 506 may be made of a material that is translucent to light of the wavelengths detected by photodetector(s) 506 and/or emitted from light source 504. For example, body 502 may be overmolded with a translucent or super translucent material in portions 514 and 515 located over light source 504 and photodetector(s) 506. In some embodiments the material of portions 514 and 515 is a medical-grade implantable silicone material (e.g. MED-4840, NuSil, USA).

Light source 504, photodetectors(s) 506 and other electronics of sensor 500 may be mounted on a flexible printed circuit board 520 embedded within body 502. Sensor 500 may include electronics that process or modify signals detected by photo detector(s) 506. For example, sensor 500 may include a trans-amplifier (current to voltage amplifier) that generates voltage output signal(s) based on current signal(s) from photodetector(s) 506. The trans-amplifier may, for example, comprise a trans-amplifier chip or a chip that include a trans-amplifier microcircuit. Generating voltage output signal(s) in sensor 500 may improve signal quality and reduce pickup of noise and/or simplify construction of a NIRS controller.

In the illustrated embodiment sensor 500 includes a fast, high sensitivity trans-amplifier chip between light source 504 and photodetector(s) 506. The effect of noise may be further reduced by using a low-noise LED for light source 504 and using a high responsivity, low noise light detector (e.g. photodiode) for photodetector(s) 506.

A dorsal surface of body 502 includes features for holding sensor 500 in place at a desired location, for example a location in which the ventral surface of body 502 is positioned against a patient's spinal cord. In the illustrated embodiment these features include depressions 512. Depressions 512 may, for example, be in the form of shallow dimples. Holding devices may be engaged with one or more of depressions 512. For example, in many cases sensor 500 will be used to monitor a spinal cord of a patient that is being held in place by a fixation system. A lateral connector anchored to the spinal fixation may be positioned to engage in a depression 512 to prevent sensor 500 lifting off from the tissues on which it has been placed to monitor.

Sensor 500 may include any one or more features described above in relation to sensor 100. For example:

Flap 510 may have any characteristics described above in relation to flap 190. For example, in some embodiments flap 510 has a thickness of approximately 0.4 mm.

Body 502 and/or flap 510 may be formed from suitable biocompatible materials such as suitable grades of biocompatible silicone. For example, body 502 may be formed of MED-4840 liquid silicone rubber which is available from NuSil, USA or a a two part platinum, catalyzed silicone elastomer such as Dow Corning® QP1 from Nusil® Polymer Systems Technology Ltd. (Buckinghamshire, UK). The material of body 502 may, for example be made of a material or materials designed for medical components that are intended for human implantation for up to 30 days. The QP1 material is a pumpable, thermoset, silicone elastomer, ideal for liquid injection molding and close tolerance parts.

Light source 504 may emit light of plural wavelengths (e.g. five wavelengths).

The interoptode distance between light source 504 and photodetector(s) 506 may be in the range of 8 mm to 20 mm. In an example embodiment the interoptode distance between light source 504 and a photodetector 506 is 10 mm. In another example embodiment the interoptode distance between light source 504 and a first photodetector 506A is 10 mm and the interoptode distance between light source 504 and a second photodetector 506B is 16 mm.

Sensor 500 may be connected to other equipment by a cable 200.

etc.

Some embodiments provide two, three or more pairs of light source and photodetector that are separated by different distances. Such embodiments may include plural light sources and/or plural photodetectors. The distances between the different pairs of light sensor and photodetector may, for example, be in the range of 5 to 35 mm. Such structures are advantageous because the depth of the tissues interrogated by a light source/photodetector pair increases with the distance by which the pair is spaced apart. The different pairs of light source and light detector may be used as described herein to acquire any NIRS parameters for different depths in tissue (e.g. a patient's spinal cord) adjacent to a sensor 500. Providing depth resolved NIRS parameters can assist in understanding progress in healing, the effectiveness of certain medications, the general status of the tissue and/or the like. Different pairs of light source and photodetector may also be spaced apart along a sensor 500 to provide spatially resolved NIRS parameters at the same or different depths.

When sensor 500 is in operation, light emitter 504 emits light on a ventral side of body 502. The light interacts with tissue. Some of the light is backscattered and is detected by photodetector(s) 506. In embodiments where there are two photodetectors 506A, 506B at different distances from light source 504 sensor 500 may be used as a two-channel SC-NIRS sensor that is capable of measuring the optical density at both superficial and deeper layers of the spinal cord. The resulting outputs may be processed to quantify and monitor tissue hemodynamics and oxygenation in an extended volume of the spinal cord. Additionally, by processing data detected by two photodetectors 506, more precise measurement is feasible.

The design features of sensor 500 can facilitate: insertion of the sensor, fixation of the sensor (e.g. in a location to monitor a spinal cord of a patient) and safe removal of the sensor. Sensor 500 may be implemented in a way which minimizes total volume of sensor 500.

NIRS Processing Device

NIRS processing device 800 is in signal communication with NIRS controller 400 to receive and/or transmit data. NIRS processing device 800 runs software operative to process light intensity data from NIRS controller 400 to yield, collect, store, analyze and/or display various NIRS parameters.

NIRS parameters may, for example, be (non-limiting):
stored in a datastore;
displayed on a display in numeric form;
displayed on a display in the form of a graph showing variations with time;
printed for a user;
monitored by a condition monitor to, for example, trigger an alarm when one or more NIRS parameters has a value outside of a corresponding range;
etc.

NIRS processing device 800 runs one or more algorithms for processing data obtained by light detector 140. For example, NIRS processing device 800 may calculate and/or monitor one or more NIRS parameters such as:

Changes in oxygenated ($O_2Hb$) chromophore concentration.

Changes in deoxygenated (HHb) chromophore concentration.

Total hemoglobin (THb)-THb is a NIRS parameter of tissue hemodynamics defined by the sum of $O_2Hb$ and HHb.

Hemoglobin difference (Hbdiff)-Hbdiff is a NIRS parameter of tissue oxygenation changes defined by subtracting HHb from $O_2Hb$.

Tissue Oxygenation Index (TOI)-TOI is an absolute measure of tissue oxygenation.

Changes in the redox status of cytochrome c Oxidase (CCO)—CCO is a subcellular oxygenation parameter (the redox status of CCO reflects oxygen supply and consumption of tissue at a mitochondrial level).

The algorithms may apply the Modified Beer-Lambert Law (see Eq. 1 below).

Where light source 120 of NIRS sensor 100 comprises light emitters which can be controlled to emit light at different wavelengths at different times (e.g. five different wavelengths), NIRS processing device 800 may execute a multi-wavelength (MW) NIRS algorithm to compute the NIRS parameters.

TOI is a particularly useful NIRS parameter for monitoring patients suffering from SCI as well as other indications. TOI may be a nonlinear function of optical attenuation. For a given wavelength, attenuation can be calculated by the modified Beer-Lambert law:

$$OD = -\log\frac{I}{I_0} = \sum_i \varepsilon_i c_i Bl + c \quad \text{(Eq. 1)}$$

where OD is the optical density or attenuation, $I_0$ is the incident light intensity, I is the detected light intensity, $\varepsilon_i$ is a molar extinction coefficient for attenuating species i, $c_i$ is the concentration of attenuating species i, Bl is the path length, and c is an error adjustment term which accounts for signal losses due to scattering. Accurately estimating the scattering term c can be an obstacle for calculating TOI accurately.

Recording measurements of intensities of backscattered light at multiple wavelengths advantageously allow NIRS processing device 800 to adopt a wavelength-dependent model which accounts for scattering. Making attenuation calculations based on data corresponding to signals picked up from multiple wavelengths may advantageously yield greater accuracy. An example of a wavelength dependent algorithm for estimating changes in concentration of CCO is described in Dizem Arifler et al. Optimal wavelength combinations for near-infrared spectroscopic monitoring of changes in brain tissue hemoglobin and cytochrome c oxidase concentrations, Biomed Opt Express. 2015 Mar. 1; 6(3): 933-947 which is hereby incorporated by reference as if fully set forth herein for all purposes.

In some embodiments NIRS system 10 adjusts driving values for light emitters 121 for individual situations. The driving values may be adjusted to cause output signals from light detector 140 to be within a given range. This may be beneficial, for example, where the output signals are digitized using an ADC. Higher resolution measurements may be obtained when the signals being measured have amplitudes in a higher part of the ADC range (as long as the ADC is not saturated). In such embodiments, light emitters 121 may each initially be activated using a predetermined driving signal level. Based on the corresponding output signals from light detector 140 the driving signal levels for different light emitters 121 may individually be adjusted to bring the corresponding output signal into the desired range. The adjustment may be zero (no adjustment) for cases where the corresponding output signal is already in the desired range. In other cases the adjustment may increase or decrease the driving signal within allowable limits.

Where such adjustment has been made it is desirable to normalize the output signals from light detector 140 to take account of the fact that the output of the corresponding light emitter 121 is not 'standard'. Normalization facilitates using a common algorithm to yield NIRS parameters and may help to avoid mistaking changes in detected intensity caused by absorption for changes in detected intensity caused by light emitters 121 having light outputs that differ from standard light outputs.

Normalization may be done by dividing the value of the detector output signal by a factor which indicates how the actual light output power at the wavelength corresponds to the 'standard' or 'reference' optical power for that wavelength. For example, if for a particular wavelength the selected power level is 1.2 times higher than the reference power level then a normalized output signal may be obtained by dividing the output signal of detector 140 by 1.2.

Where the driving signals for light emitters 121 are voltage signals and light emitters 121 comprise solid state junctions then normalization should take into account the fact that the optical power output of light emitters 121 will usually scale as $V-V_0$ where V is the voltage of the signal driving a light emitter 121 and $V_0$ is a turn on voltage for the light emitter.

For example, NIRS system 10 may have access to a value of $V_0$ and $V_{set}$ for each of light emitters 121 where $V_{set}$ is the standard voltage for the light emitter. System 10 may base a normalization factor on differences between $V_{set}$ and $V_0$ and V and $V_0$. For example, normalization may compute a normalized output signal according to a calculation like:

$$P_{norm} = \frac{P}{V - V_0 / V_{set} - V_0} \quad \text{(Eq. 2)}$$

where: $P_{norm}$ is the normalized output power and P is the power measured by detector 140.

Although $V_0$ can be theoretically predicted, manufacturing process variations can cause $V_0$ to vary among different light sources 120. In some cases $V_0$ is measured for each emitter 121. One way to measure $V_0$ is using an optical phantom (i.e. materials that simulate the optical characteristics of and mimic light distributions in living tissues). NIRS sensor 100 may be placed against an optical phantom to perform NIRS on the optical phantom. The optical phantom may provide a known attenuation at different wavelengths. NIRS controller 400 drives the emitters 121 of light source 120 to shine light with various wavelengths into the optical phantom. The intensity of light detected by light detector 140 is measured in each case. In some embodiments this process of shining light into the optical phantom is repeated for different intensity levels for each of the emitters of light source 120.

Since power scales with $V-V_0$, $V_0$ can be estimated by measuring detected power at two or more voltages and extrapolating to find the voltage of zero optical power. Where power is detected at three or more voltages linear least squares fitting may be applied to estimate $V_0$. System 10 may process results of the phantom measurements to determine an offset voltage ($V_0$) for each of the light emitters 121.

In some embodiments, processing device 800 implements a machine learning method to train an algorithm to generate accurate NIRS parameters. The machine learning methods may help derive the nonlinear dependence of the TOI on optical attenuation. The method involves estimating optical attenuation at various wavelengths and feeding the estimates (along with their higher-order moments) into a linear regression model or a multi-layer neural network. The linear regression model or multi-layer neural network may be trained on multiple subjects using reference TOI data which may be calculated from imaging various optical phantoms.

A reference dataset containing reference (or "expected") TOI and corresponding data obtained using a NIRS sensor as described herein may be used to train the model and/or neural network for calculating TOI.

Reference TOI data can be collected at the same time as acquiring NIRS data by performing an alternative TOI measurement. TOI may be measured, for example, by analyzing a venous blood sample, using clinical monitors for tissue oximetry, etc. Reference data can also be obtained by inducing occlusion or performing isometric and isotonic contractions and recording the TOI simultaneously using the sensor and a reference device.

The reference dataset preferably includes reference TOI data and corresponding NIRS data for multiple subjects. The reference data may be normalized (e.g. as described above) and used for training the model. The trained model is then used by software executing on NIRS processing device 800 to calculate TOI and/or other NIRS parameters of a tissue based on measures of attenuation at different wavelengths.

Figure 4:
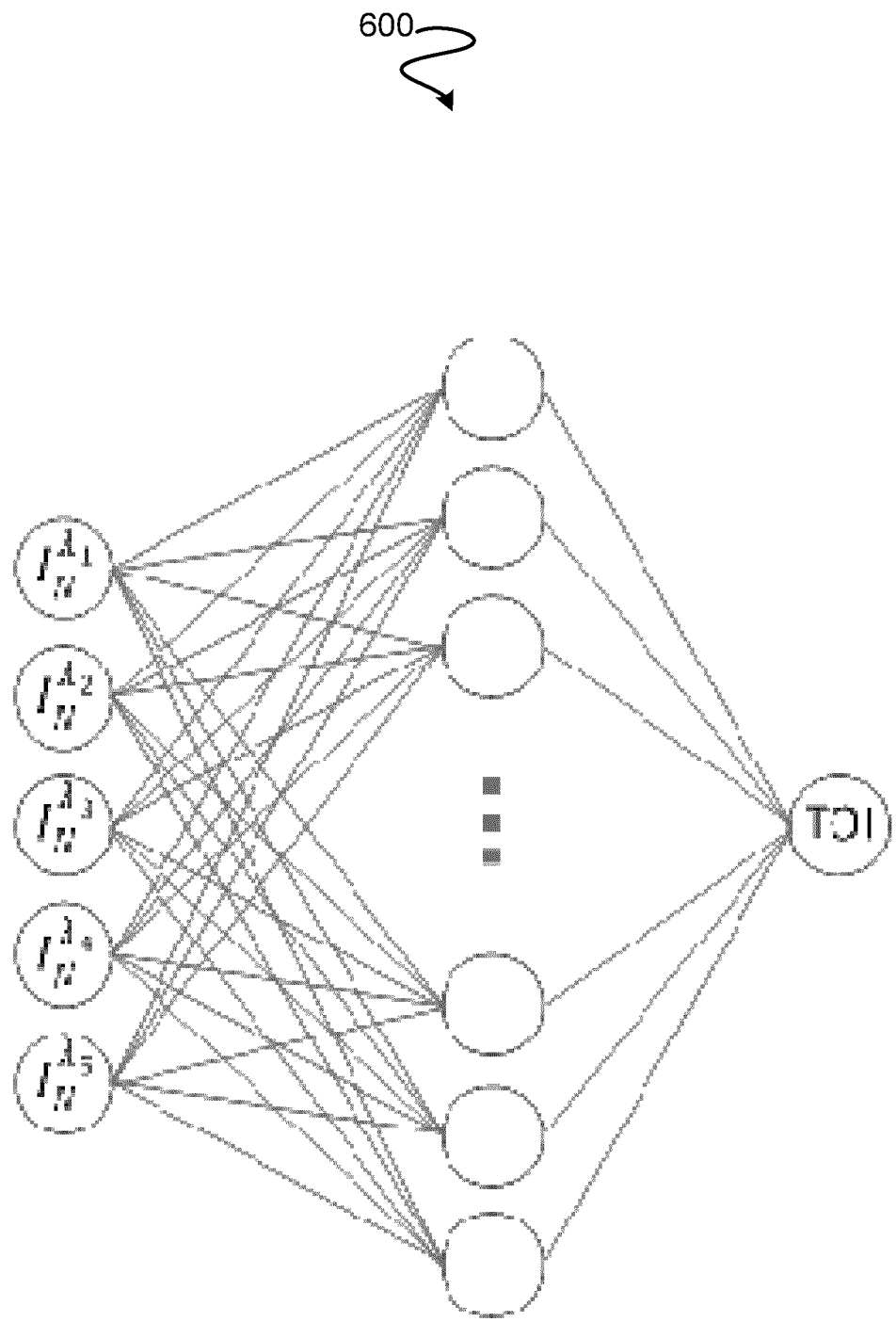
FIG. 4 is a schematic diagram depicting the architecture of an example Artificial Neural Network (ANN) that may be used for estimating a NIRS parameter based on normalized intensity values detected by a NIRS sensor.

FIG. 4 is schematic diagram depicting the architecture of an example Artificial Neural Network (ANN) 600 that may be configured for estimating TOI based on measures of attenuation at different wavelengths. A single hidden layer is used in the example embodiment shown in FIG. 4. Multiple hidden layers may be used in other embodiments.

In the example embodiment shown in FIG. 4, normalized intensities of light detected by NIRS sensor 100 are adjusted to account for a background light level and subsequently fed into the input layer of ANN 600. The adjusted normalized intensities of various wavelengths can be calculated as:

$$I_N^{\lambda_i} = \frac{I^{\lambda_i} - I_{BL}}{I_0^{\lambda_i}} \quad \text{(Eq. 3)}$$

where $I^{\lambda_i}$ is the detected intensity, $I_{BL}$ is the baseline intensity (intensity when no emitters are on) and $I_0^{\lambda_i}$ is the driving intensity for the emitters (e.g. LEDs) as determined from above.

Calculating TOI from a set of different wavelength attenuations advantageously provides a highly reproducible measure of the TOI that implicitly adapts to the complexities of the attenuation/TOI relationship. The technique is also capable of advantageously refining its calibration to a specific subject (i.e. patient 20) if new reference data becomes available. Subject variability is expected due to variability in tissue characteristic between subjects. The recalibration method above allows NIRS system 10 to adapt to differences between subjects.

Signal Quality Control

In some embodiments, NIRS monitoring system 10 measures a contact quality value to assess the quality of optical coupling between a tissue of patient 20 (e.g. spinal cord 25) and NIRS sensor 100. Poor coupling between NIRS sensor 100 and a tissue of patient 20 can result in detector 140 transmitting low intensity signals to NIRS controller 400. Receiving low intensity signals at NIRS controller 400 can result in inaccurate TOI calculations at NIRS processor 800. Through driving light source 120 with specific waveforms and/or use of pattern recognition techniques described below, NIRS monitoring system 10 can quantify the quality of contact between NIRS sensor 100 and tissue in real-time.

In some embodiments, NIRS processing device 800 implements a base level check which involves detecting the presence of expected wavelengths in a single frame. A frame in which signals from all wavelengths cannot be detected or in which signals from one or more wavelengths are saturated may be rejected. NIRS processing device 800 may optionally flag frames which comprise all of the expected wavelengths and no saturation on any wavelength.

In some embodiments, NIRS processing device 800 calculates a signal-to-noise ratio by filtering a measured signal (y[n]) using an expected signal (s[n]) and dividing by the overall signal energy. The ratio of the measured signal to the overall signal power may be calculated as follows:

$$SNR = \frac{s^T y}{y^T y} \quad \text{(Eq. 4)}$$

Where s is the vector of the expected signal and y is the vector of the measured signal. T represents the transpose of a vector.

In some embodiments, NIRS processing device 800 implements computation of the contact quality measure in software to reduce the complexity, size and cost of NIRS sensor 100. For example, NIRS processing device 800 can reconstruct an "expected" data frame based on a detected amplitude and subsequently calculate a signal to noise ratio for the frame using an unmatched filter.

If too many frames are rejected or the signal to noise ratio is below a threshold for more than a certain percentage of frames, NIRS system 10 may generate a signal indicating that the contact of the NIRS sensor 100 to the tissues it is monitoring is likely bad.

Application of NIRS System to Spinal Cord Injury (SCI)

NIRS monitoring system 10 has example application for monitoring spinal cord oxygenation, hemodynamics and/or oxidative metabolism after spinal cord injury (SCI). SCI is a critical condition caused by trauma to the spine or diseases that impair spinal cord tissue. SCI results in a wide range of permanent disabilities and multi-organ dysfunctions that impair quality of life.

Monitoring oxygenation and hemodynamics of the spinal cord tissue during treatment of the acute phase of the SCI provides unique information that can be used to optimize hemodynamic management in SCI patients. Current techniques involve measuring the mean arterial blood pressure (MAP) of a patient to estimate a desired quantity of blood flow in the spinal cord. These techniques lack precision due to the inability to measure how MAP alterations actually alter oxygenation and blood flow within an injured spinal cord.

Figure 5:
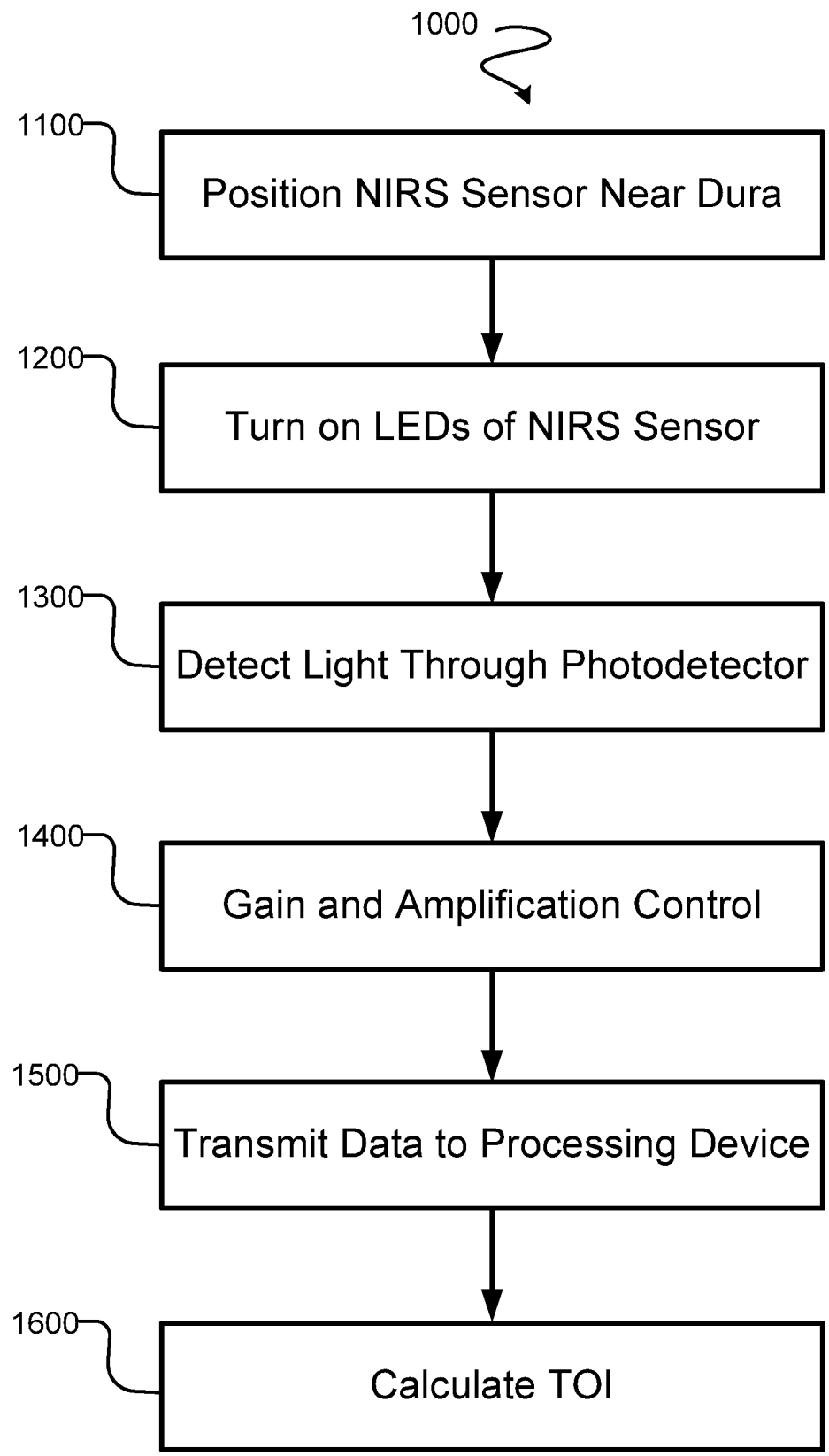
FIG. 5 is a flow diagram illustrating an example method of monitoring spinal cord oxygenation and hemodynamics using a NIRS monitoring system.

FIG. 5 is a flow diagram depicting a method 1000 of monitoring spinal cord oxygenation using NIRS monitoring system 10. Method 1000 is non-invasive (e.g. method 1000 does not require inserting a NIRS sensor directly into spinal cord 25). Method 1000 may be performed in real-time.

At block 1100 NIRS sensor 100 is positioned over spinal cord 25 of a patient 20. NIRS sensor 100 may be placed under the skin or other superficial tissue layers. NIRS sensor 100 may be placed over dura 26 to monitor a tissue of spinal cord 25.

Soft 'flaps' 190 around light source 120 and detector 140 facilitate placement and fixation of NIRS sensor 100 over the dura and isolate components of NIRS sensor 100 from blood and other fluids within the epidural space. The flaps are flexible, made from transparent implantable silicone rubber and have a thickness of around 0.3 mm. The width of the flap around the sensor may, for example be about 2 mm.

A suitable biological adhesive material (e.g. TISSEEL™ fibrin sealant) may be applied around the edges of flap 190 thus fixing the position of NRS sensor 100 over the dura.

At block 1200 NIRS controller 400 delivers power and/or control signals to light source 120 through wiring 160. NIRS controller 400 may deliver independent control signals for each of the plurality of emitters of light source 120. For example, NIRS controller 400 may deliver a first control signal to a first emitter of light source 120, a second control signal to a second emitter of light source 120, . . . , etc. In some embodiments NIRS controller 400 may deliver the control signals in a sequence to sequentially control the emission timing of the emitters of light source 120. In some embodiments NIRS controller 400 may deliver a repeated sequence of such control signals. In some embodiments the control signals may control the intensity of light emitted by the emitters of light source 120.

At block 1300, detector 140 of NIRS sensor 100 detects backscattered light from spinal cord 25. NIRS controller 400 may apply a bias voltage on detector 140 and may measure a photocurrent to determine an intensity of light incident on detector 140. Detector 140 transmits signals corresponding to detected light to NIRS controller 400.

At block 1400, analog module 420 of NIRS controller 400 converts a current signal corresponding to light detected by detector 140 into a voltage. Analog module 420 may optionally amplify the voltage. Analog module 420 may optionally perform baseline correction to the voltage. Analog module 420 may optionally further amplify the voltage through PGA 426. Analog module 420 may optionally further amplify the voltage after baseline correction.

At block 1500, the voltage corresponding to light detected by detector 140 is transmitted to digital module 440 through one or a plurality of analog to digital converters. Digital module 440 may optionally implement a time division multiplexing scheme to deliver data to NIRS processing device 800. Data may be transmitted between digital module 440 and NIRS processing device 800 through a USB cable.

At block 1600, NIRS processing device 800 runs one or a plurality of algorithms to process data corresponding to the signals of various wavelengths picked up by detector 400. NIRS processing device 800 may run a multi-wavelength (MW) NIRS algorithm involving comparing intensities of light detected for different wavelengths to calculate an attenuation value. NIRS processing device may calculate TOI based on the attenuation value. NIRS processing device 800 may implement machine learning techniques (e.g. ANN 600) to derive the relation between attenuation and TOI.

Figure 6A:
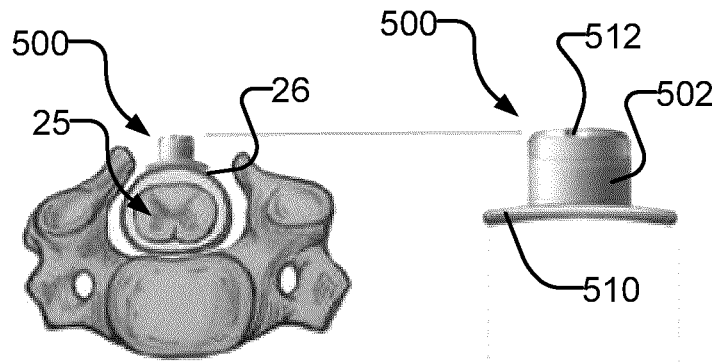
FIGS. 6A and 6B illustrate a NIRS sensor applied to monitor tissues of a patient's spinal cord.
Figure 6B:
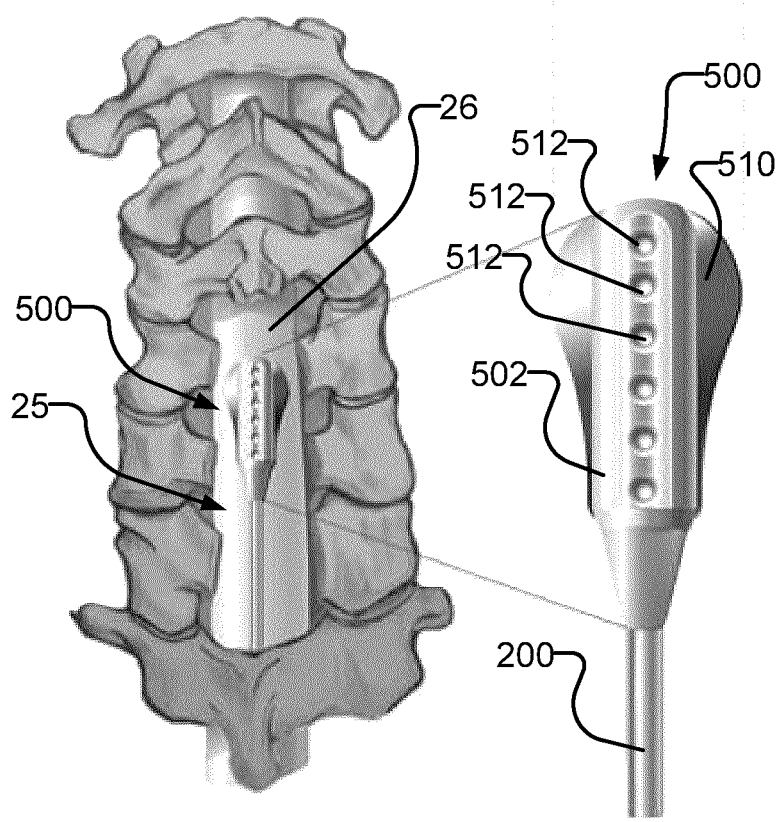

FIGS. 6A and 6B illustrate a NIRS sensor (e.g. sensor 500) applied to a patient's spinal cord.

An advantage of embodiments of the NIRS system described herein is that the system employs a single light source (with 5 wavelengths) and one photodetector to measure NIRS parameters such as TOI. This allows the sensor to be much smaller than some commercially available NIRS sensors. Embodiments of the present technology therefore can provide sensors that can be applied directly on top of the dura to measure NIRS parameters of the spinal cord. Such small sensors may be removed without requiring additional surgery. Another advantage is that providing a light source and photodetector in a probe which can be placed directly over the tissue of interest (e.g. spinal cord), instead of using optical fibers, reduces light attenuation and leakage.

The scope of the present invention includes a wide variety of possible supplementary designs to NIRS monitoring system 10 and/or alternative applications of NIRS monitoring system 10. These variations may be applied to any of the embodiments described herein, as suited, and include, without limitation the following:

NIRS sensor 100 or 500 can be implanted over any internal organ of interest such as the liver, the kidney, the bladder, the intestine or the brain to directly monitor their tissue oxygenation and hemodynamics;

the various functions and features of NIRS controller 400 and NIRS processor 800 may be interchanged and/or combined into an integrated module;

light isolation component b 130, light shield 170 and/or flap 190 may be made of a single common material (e.g. biocompatible silicone) that encapsulates the active components of NIRS sensor 100 or 500 (e.g. light source 120, detector 140, wiring 160, etc.) while providing transparent windows for light source 120 to emit light and detector 140 to collect light.

Interpretation of Terms

Unless the context clearly requires otherwise, throughout the description and the claims (where present):

"comprise," "comprising," and the like are to be construed in an inclusive sense, as opposed to an exclusive or exhaustive sense; that is to say, in the sense of "including, but not limited to".

"connected," "coupled," or any variant thereof, means any connection or coupling, either direct or indirect, between two or more elements; the coupling or connection between the elements can be physical, logical, or a combination thereof.

"herein," "above," "below," and words of similar import, when used to describe this specification shall refer to this specification as a whole and not to any particular portions of this specification.

"or," in reference to a list of two or more items, covers all of the following interpretations of the word: any of the items in the list, all of the items in the list, and any combination of the items in the list.

the singular forms "a," "an," and "the" also include the meaning of any appropriate plural forms.

Words that indicate directions such as "vertical," "transverse," "horizontal," "upward," "downward," "forward," "backward," "inward," "outward," "left," "right," "front," "back," "top," "bottom," "below," "above," "under," and the like, used in this description and any accompanying claims (where present) depend on the specific orientation of the apparatus described and illustrated. The subject matter described herein may assume various alternative orientations. Accordingly, these directional terms are not strictly defined and should not be interpreted narrowly.

Various features are described herein as being present in "some embodiments". Such features are not mandatory and may not be present in all embodiments. Embodiments of the invention may include zero, any one or any combination of two or more of such features. This is limited only to the extent that certain ones of such features are incompatible with other ones of such features in the sense that it would be impossible for a person of ordinary skill in the art to construct a practical embodiment that combines such incompatible features. Consequently, the description that "some embodiments" possess feature A and "some embodiments" possess feature B should be interpreted as an express indication that the inventors also contemplate embodiments which combine features A and B (unless the description states otherwise or features A and B are fundamentally incompatible).

Where a component (e.g., a circuit, module, assembly, device) is referred to above, unless otherwise indicated, reference to that component (including a reference to a "means") should be interpreted as including as equivalents of that component any component which performs the function of the described component (i.e., that is functionally equivalent), including components which are not structurally equivalent to the disclosed structure which performs the function in the illustrated exemplary embodiments of the invention.

Specific examples of systems, methods and apparatus have been described herein for purposes of illustration. These are only examples. The technology provided herein can be applied to systems other than the example systems described above. Many alterations, modifications, additions, omissions and permutations are possible within the practice of this invention. This invention includes variations on described embodiments that would be apparent to the skilled addressee, including variations obtained by: replacing features, elements and/or acts with equivalent features, elements and/or acts; mixing and matching of features, elements and/or acts from different embodiments; combining features, elements and/or acts from embodiments as described herein with features, elements and/or acts of other technology; and/or omitting combining features, elements and/or acts from described embodiments.

It is therefore intended that the following appended claims and claims hereafter introduced are interpreted to include all such modifications, permutations, additions, omissions and sub-combinations as may reasonably be inferred. The scope of the claims should not be limited by the preferred embodiments set forth in the examples, but should be given the broadest interpretation consistent with the description as a whole.

What is claimed is:

1. A near infrared spectroscopy (NIRS) sensor comprising:
    a body having a dorsal face, a ventral face, and proximal and distal ends, the body supporting a light source and a photodetector in a spaced apart relationship, the light source operative to emit light from the ventral face of the body and the photodetector operative to detect light incident on the ventral face of the body and to generate an output signal;
    a flexible flap extending laterally from the body along opposed first and second sides of the body; and
    a NIRS controller comprising electronic circuits connected to control the light source to emit light of different wavelengths at different times wherein the NIRS controller is configured to control the light source to emit light of each of five distinct wavelengths, λ1 to λ5, in a sequence and to sample the output signal of the photodetector in coordination with the operation of the light sources to obtain a sequence of light intensity readings each of the light intensity readings corresponding to one of the wavelengths and the NIRS controller is configured to drive each of a plurality of light emitters of the light source with a corresponding driving signal wherein the corresponding driving signals for different ones of the light emitters vary in one or more of waveform, duty cycle, amplitude, and frequency.

2. The NIRS sensor according to claim 1 wherein the flap extends between the first and second sides around the distal end of the body.

3. The NIRS sensor according to claim 1 wherein the flap has a thickness that is less than a thickness of the body.

4. The NIRS sensor according to claim 1 wherein the flap has a thickness in the range of 0.2 mm to 0.4 mm.

5. The NIRS sensor according to claim 1 wherein a material of the flap extends continuously across the dorsal face of the body and encapsulates the light source and the photodetector.

6. The NIRS sensor according to claim 5 wherein the flap comprises a flexible mesh.

7. The NIRS sensor according to claim 1 wherein the flap is formed with a curvature such that a ventral face of the flap is concave and has a cylindrical geometry.

8. The NIRS sensor according to claim 1 wherein the flap is wider at the distal end of the body and tapers in width along the body toward the proximal end of the body.

9. The NIRS sensor according to claim 8 wherein a profile of a perimeter of the flap is teardrop shaped.

10. The NIRS sensor according to claim 8 wherein a perimeter of the flap has a convex portion adjacent to the distal end of the body that joins onto concave tapering portions on both sides of the body.

11. The NIRS sensor according to claim 10 comprising grooves in the flap that extend along both sides of the body.

12. The NIRS sensor according to claim 1 wherein the flap is formed with shallow grooves that extend along both sides of the body on the dorsal face of the flap.

13. The NIRS sensor according to claim 1 wherein a portion of the body between the light source and the photodetector is opaque to the light emitted by the light source and blocks direct transmission of light from the light source to the photodetector and the light source is operative to emit light having wavelengths in the range of 600 nm to 1000 nm.

14. The NIRS sensor according to claim 1 wherein the light source comprises a plurality of light emitters, the plurality of light emitters each emit a different one of a plurality of wavelengths of light, the plurality of wavelengths of light are distributed around an isosbestic point, and the plurality of wavelengths includes one or more wavelengths above the isosbestic point and one or more wavelengths below the isosbestic point.

15. The NIRS sensor according to claim 14 wherein the plurality of wavelengths includes two or more wavelengths selected from 660±10 nm, 730±10 nm, 810±10 nm, 850±10 nm, and 940±10 nm.

16. The NIRS sensor according to claim 1 wherein the light source is spaced apart from the photodetector by a first distance in the range of 5 mm to 20 mm, the photodetector is a first photodetector and the NIRS sensor comprises a second photodetector spaced apart from the light source, the second photodetector operative to detect light incident on the ventral face of the body, and the second photodetector is spaced apart from the light source by a second distance in the range of 1½ to 2 times the first distance.

17. The NIRS sensor according to claim 1 wherein the dorsal surface of the body is formed with a plurality of recesses and the recesses comprise a row of shallow dimples.

18. The NIRS sensor according to claim 1 comprising a cable connected to the proximal end of the body, wherein the cable comprises first electrical conductors connected to drive the light source and second electrical conductors connected to carry an output signal from the photodetector and the cable comprises a sheath enclosing the first and second conductors, the first conductors run within a first electrically conductive shield inside the sheath and the second conductors run within a second electrically conductive shield inside the sheath.

19. The NIRS sensor according to claim 1 comprising a trans-amplifier within the body and connected to convert a current signal output by the photodetector to a voltage signal.

* * * * *